US010086903B2

(12) United States Patent
Hamaguchi et al.

(10) Patent No.: US 10,086,903 B2
(45) Date of Patent: Oct. 2, 2018

(54) SADDLE-RIDDEN VEHICLE

(71) Applicant: SUZUKI MOTOR CORPORATION, Hamamatsu-shi, Shizuoka (JP)

(72) Inventors: Ryohei Hamaguchi, Hamamatsu (JP); Kazuhiro Okita, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/332,565

(22) Filed: Oct. 24, 2016

(65) Prior Publication Data

US 2017/0113758 A1  Apr. 27, 2017

(30) Foreign Application Priority Data

Oct. 27, 2015 (JP) ................................ 2015-210462
Oct. 27, 2015 (JP) ................................ 2015-210464

(51) Int. Cl.
| | |
|---|---|
| *B60K 13/02* | (2006.01) |
| *B62M 7/02* | (2006.01) |
| *B62K 11/04* | (2006.01) |
| *F02B 29/04* | (2006.01) |
| *F02B 61/02* | (2006.01) |
| *F02D 41/00* | (2006.01) |

(Continued)

(52) U.S. Cl.
CPC ............... *B62M 7/02* (2013.01); *B62J 17/00* (2013.01); *B62J 99/00* (2013.01); *B62K 11/04* (2013.01);
(Continued)

(58) Field of Classification Search
CPC .......... B62M 7/02; B62K 11/04; B62K 11/00; F02M 35/00; F02M 35/04; F02M 35/162;
(Continued)

(56) References Cited

U.S. PATENT DOCUMENTS 4,440,255 A  4/1984  Shinozaki ...................... 180/225
4,475,617 A  10/1984  Minami et al. ............... 180/219

(Continued)

FOREIGN PATENT DOCUMENTS

DE  10 2014 113 929 A  3/2015
EP      0 707 141 B1  3/1999

(Continued)

OTHER PUBLICATIONS

German Office Action dated Feb. 10, 2017, issued by the German Patent and Trademark Office in corresponding application DE 10 2016 012 796.1.

*Primary Examiner* — James M Dolak
(74) *Attorney, Agent, or Firm* — Stein IP, LLC

(57) ABSTRACT

A saddle-ridden vehicle includes: a pair of frame members which are disposed on one side and on other side in a vehicle width direction so as to extend in a vehicle front-rear direction; an engine which is disposed between and supported by the pair of frame members; an air cleaner which cleans air for fuel combustion; a supercharger which compresses the air cleaned by the air cleaner; an intercooler which cools, using a cooling wind, the air compressed by the supercharger and supplies resulting air to the engine; and an exhaust wind duct which determines a discharge position or a discharge direction of the cooling wind discharged from the intercooler, and the exhaust wind duct is disposed above the engine on the one side in the vehicle width direction and extends to rear of the engine.

8 Claims, 20 Drawing Sheets

(51) Int. Cl.
- *F02M 35/04* (2006.01)
- *F02M 35/10* (2006.01)
- *F02M 35/16* (2006.01)
- *B62J 17/00* (2006.01)
- *B62J 99/00* (2009.01)

(52) U.S. Cl.
CPC .............. *F02B 29/04* (2013.01); *F02B 61/02* (2013.01); *F02D 41/0007* (2013.01); *F02M 35/048* (2013.01); *F02M 35/10157* (2013.01); *F02M 35/162* (2013.01); *Y02T 10/144* (2013.01); *Y02T 10/146* (2013.01)

(58) Field of Classification Search
CPC ........... F02M 35/048; F02M 35/10157; F02M 35/10242; F02B 29/04; F02B 29/0406; F02B 29/0475; F02B 67/00; F02B 67/10; F02B 61/02

See application file for complete search history.

(56) References Cited

U.S. PATENT DOCUMENTS

| | | | | |
|---|---|---|---|---|
| 9,399,974 | B2* | 7/2016 | Ito | B60K 13/02 |
| 9,638,148 | B2* | 5/2017 | Watanabe | F02B 33/40 |
| 9,957,928 | B2* | 5/2018 | Watanabe | F02B 39/00 |
| 9,975,586 | B2* | 5/2018 | Shigihara | B62J 17/00 |
| 9,982,592 | B2* | 5/2018 | Naruoka | F02B 33/40 |
| 9,988,121 | B2* | 6/2018 | Inomata | B62J 37/00 |
| 10,012,139 | B2* | 7/2018 | Tanaka | F02B 33/40 |
| 2015/0083513 | A1 | 3/2015 | Ito et al. | 180/229 |
| 2016/0061165 | A1 | 3/2016 | Watanabe et al. | |

FOREIGN PATENT DOCUMENTS

| | | |
|---|---|---|
| EP | 2 075 181 B1 | 11/2016 |
| JP | 2002-256895 A | 9/2002 |
| JP | 2015-83437 A | 4/2015 |

\* cited by examiner (1)

(2)

(1)

(2)

(3)

(1)

(2)

SADDLE-RIDDEN VEHICLE

CROSS-REFERENCE TO RELATED APPLICATIONS

This application claims the benefit of Japanese Patent Application JP 2015-210462, filed Oct. 27, 2015, and Japanese Patent Application JP 2015-210464, filed Oct. 27, 2015, the entire contents of which are hereby incorporated by reference, the same as if set forth at length.

FIELD OF THE INVENTION

The present invention relates to a saddle-ridden vehicle that is equipped with a supercharger.

BACKGROUND OF THE INVENTION

The thermal efficiency and hence the output power of an engine of a saddle-ridden vehicle such as a motorcycle can be increased by equipping the engine with a supercharger and supplying air that has been compressed by the supercharger to the combustion chambers of the engine. JP-A-2015-83437 discloses a saddle-ridden vehicle which is equipped with a supercharger.

The saddle-ridden vehicle disclosed in JP-A-2015-83437 is equipped with an air cleaner for cleaning external air, a supercharger for compressing air cleaned by the air cleaner, an intercooler for cooling air that has been compressed by the supercharger and thereby made high in temperature, and a surge tank for supplying air cooled by the intercooler after storing it temporarily. In this saddle-ridden vehicle, an air intake pipe connects the air cleaner and the supercharger. An air outlet pipe connects the supercharger and the intercooler. The intercooler and the surge tank are adjacent to each other and a short pipe connects them directly.

On the other hand, an electronically controlled throttling method is known in which an accelerator manipulation amount of a rider is detected by a sensor and an electric drive motor is operated on the basis of the detected accelerator manipulation amount, whereby the degree of opening of a throttle valve is controlled. JP-A-2002-256895 discloses a throttle control device that employs the electronically controlled throttling method.

SUMMARY OF THE INVENTION

Saddle-ridden vehicles having a supercharger are equipped with an intercooler to cool air that that has been compressed by the supercharger and thereby made high in temperature. Where the intercooler is of an air cooling type, to cool air whose temperature has been made high by compression, it is necessary to blow a cooling wind onto the intercooler. Provided for this purpose are a wind guide duct for guiding a cooling wind to the intercooler and an exhaust wind duct for discharging, to the outside, a cooling wind that is discharged from the intercooler after cooling air.

The temperature of a cooling wind is high when it is discharged from the exhaust wind duct because in passing through the intercooler it cools air that has been compressed by the supercharger and thereby made high in temperature. If a high-temperature cooling wind that is discharged from the exhaust wind duct blows directly onto other components around an engine, these components are lowered in performance. If a high-temperature cooling wind that is discharged from the exhaust wind duct is put into an air cleaner as air for fuel combustion, the air cooling effect of the intercooler may be lowered. Furthermore, it is necessary to prevent an event that a rider is hit by a high-temperature cooling wind that is discharged from the exhaust wind duct.

The cooling wind discharge position and direction of the exhaust wind duct should be set properly to prevent problems caused in other components by a high-temperature cooling wind and hitting of a rider by a high-temperature cooling wind. However, since a large number of components are disposed around the engine of a saddle-ridden vehicle, it is difficult to secure a sufficient space for installation of the exhaust wind duct and hence to set its cooling wind discharge position and direction in the above manner.

The present invention has been made to solve, for example, the above problems, and an object of the invention is therefore to provide a saddle-ridden vehicle in which problems that would otherwise be caused in other components by a high-temperature cooling wind discharged from an exhaust wind duct and hitting of a rider by such a cooling wind can be prevented.

To solve the above problems, a first aspect of the invention provides a saddle-ridden vehicle having a pair of frame members which are disposed on one side and on the other side in the vehicle width direction so as to extend in the vehicle front-rear direction; an engine which is disposed between and supported by the pair of frame members; an air cleaner which cleans air for fuel combustion; a supercharger which compresses the air cleaned by the air cleaner; an intercooler which cools, using a cooling wind, the air compressed by the supercharger and supplies resulting air to the engine; and an exhaust wind duct which determines a discharge position or a discharge direction of the cooling wind discharged from the intercooler, characterized in that the exhaust wind duct is disposed above the engine on the one side in the vehicle width direction and extends to the rear of the engine.

According to this mode of the invention, since the exhaust wind duct extends to the rear of the engine, a high-temperature cooling wind that is discharged from the exhaust wind duct can be prevented from blowing directly onto other components disposed around the engine, being put into the air cleaner as air for fuel combustion, or hitting a rider. Furthermore, since the exhaust wind duct is disposed above the engine on the one side in the vehicle width direction, even in the case where a number of components are disposed around the engine, a space for installation of the exhaust wind duct can be secured easily and a high-temperature wind discharge position and direction of the exhaust wind duct can be set properly so that no high-temperature wind blows directly onto the other components, is put into the air cleaner, or hits a rider.

In the above-described saddle-ridden vehicle according to the first aspect of the invention, it is preferable that in a side view of the saddle-ridden vehicle the exhaust wind duct extend alongside the one, disposed on the one side in the vehicle width direction, of the pair of frame members.

According to this mode of the invention, the exhaust wind duct allows a cooling wind that is discharged from the intercooler to flow smoothly to the rear of the engine.

In the above-described saddle-ridden vehicle according to the first aspect of the invention, it is preferable that in a top view of the saddle-ridden vehicle the exhaust wind duct be disposed between the pair of frame members.

According to this mode of the invention, the width of the saddle-ridden vehicle can be shortened while the exhaust wind duct is provided.

In the above-described saddle-ridden vehicle according to the first aspect of the invention, it is preferable that the exhaust wind duct extend toward a center line in the vehicle width direction.

According to this mode of the invention, the exhaust wind duct can discharge a high-temperature cooling wind to a position that is distant from the feet etc. of a rider.

In the above-described saddle-ridden vehicle according to the first aspect of the invention, the exhaust wind duct may have a support portion which supports the intercooler.

According to this mode of the invention, the exhaust wind duct and the intercooler can be attached to the vehicle body of the saddle-ridden vehicle in the form of an integrated assembly and hence work of mounting the exhaust wind duct on the vehicle body can be simplified.

In the above-described saddle-ridden vehicle according to the first aspect of the invention, the exhaust wind duct may be attached to the air cleaner.

According to this mode of the invention, the air cleaner and the exhaust wind duct can be attached to the vehicle body of the saddle-ridden vehicle in the form of an integrated assembly and hence work of mounting the exhaust wind duct on the vehicle body can be simplified.

The above-described saddle-ridden vehicle according to the first aspect of the invention may be such that the air cleaner and the intercooler are arranged side by side in the vehicle width direction above the engine; that the exhaust wind duct has an exhaust wind introduction portion into which the cooling wind discharged from the intercooler is introduced and an exhaust wind guide portion which guides, to a prescribed direction, the cooling wind introduced into the exhaust wind introduction portion; and that the exhaust wind introduction portion is disposed between the air cleaner and the intercooler.

According to this mode of the invention, the air cleaner, the exhaust wind introduction portion of the exhaust wind duct, and the intercooler can be attached to the vehicle body of the saddle-ridden vehicle in the form of an integrated assembly and hence work of mounting the exhaust wind duct on the vehicle body can be simplified. Furthermore, by implementing the exhaust wind introduction portion and the exhaust wind guide portion as separate members, it is possible to mount, first, an integrated unit of the air cleaner, the exhaust wind duct, and the intercooler to the vehicle body and then attach the exhaust wind guide portion to the exhaust wind introduction portion. This assembling procedure can further simplify work of mounting the exhaust wind duct on the vehicle body.

The above-described saddle-ridden vehicle according to the first aspect of the invention may be such that the exhaust wind duct has an expansion portion between the exhaust wind introduction portion and the exhaust wind guide portion; and that the expansion portion has a passage through which the cooling wind flows from the exhaust wind introduction portion to the exhaust wind guide portion, and an intermediate portion of the passage is larger in flow passage area than an inflow end and an outflow end of the passage.

According to this mode of the invention, a flow of a cooling wind from the intercooler to the exhaust wind duct can be improved. This can enhance the intercooler's function of cooling air that has been compressed by the supercharger and thereby increased in temperature.

As described above, the first aspect of the invention makes it possible to prevent problems that would otherwise be caused in other components by a high-temperature cooling wind discharged from the exhaust wind duct and hitting of a rider by such a cooling wind can be prevented.

Incidentally, the following problems arise in employing the electronically controlled throttling method in saddle-ridden vehicles having a supercharger.

Motorcycles having a supercharger are equipped with an intercooler. The intercooler, which is a device for cooling air for fuel combustion that has been compressed by the supercharger and thereby made high in temperature, is supplied with a high-temperature cooling wind. Thus, the temperature of a neighborhood of the intercooler is made high by heat that is emitted from the intercooler. The intercooler discharges a cooling wind whose temperature has been made by cooling compressed air. On the other hand, in the electronically controlled throttling method, an electric drive motor is used for controlling a throttle valve and the performance of the electric drive motor lowers at a high temperature. It is therefore desired to protect the drive motor from heat emitted from the intercooler and the heat of a cooling wind that is discharged from the intercooler.

One method for satisfying the above demand would be to install the drive motor at such a position as to be affected little by heat emitted from the intercooler or the heat of a cooling wind that is discharged from the intercooler. However, to facilitate transmission of motive power from the drive motor to the throttle valve, the drive motor should be disposed close to the throttle valve. Furthermore, since a large number of components are disposed around the engine of a saddle-ridden vehicle, it is difficult to secure a sufficient empty space. It is difficult to install the drive motor at such a position as to be affected little by heat emitted from the intercooler or the heat of a cooling wind that is discharged from the intercooler.

The invention has been made to solve, for example, the above problems, and another object of the invention is therefore to provide a saddle-ridden vehicle in which a drive motor of an electronically controlled throttle device can be prevented from being lowered in performance by heat emitted from an intercooler or the heat of a high-temperature cooling wind discharged from the intercooler.

To solve the above problems, a second aspect of the invention provides a saddle-ridden vehicle having a pair of frame members which are disposed on one side and on the other side in the vehicle width direction so as to extend in the vehicle front-rear direction; an engine which is disposed between and supported by the pair of frame members; an air cleaner which cleans air for fuel combustion; a supercharger which compresses the air cleaned by the air cleaner; an intercooler which cools, using a cooling wind, the air compressed by the supercharger; a surge tank which temporarily stores the air cooled by the intercooler; and an electronically controlled throttle device which controls the rate of supply of air from the surge tank to an intake port of the engine, characterized in that the electronically controlled throttle device comprises a throttle body having an air intake passage which connects the surge tank and the intake port of the engine, a throttle valve disposed in the air intake passage, and a drive motor which controls the degree of opening of the throttle valve; and that the intercooler is disposed above the engine on the one side in the vehicle width direction and the drive motor is disposed above or in the rear of the engine on the other side in the vehicle width direction.

According to this mode of the invention, the intercooler and the drive motor can be set distant from each other in the left-right direction. Thus, heat that is emitted from the intercooler is not prone to be transmitted to the drive motor 175 and high-temperature cooling wind that is discharged from the intercooler is not prone to hit the drive motor.

In the above-described saddle-ridden vehicle according to the second aspect of the invention, it is preferable that the saddle-ridden vehicle further comprise an exhaust wind duct which determines a discharge position or a discharge direction of the cooling wind discharged from the intercooler; and that the exhaust wind duct be disposed between the intercooler and the drive motor, and a discharge outlet of the exhaust wind duct be located on the one side in the vehicle width direction.

According to this mode of the invention, the exhaust wind duct which is disposed between the intercooler and the drive motor exercises an effect of interrupting transmission of heat from the intercooler to the drive motor. Furthermore, a high-temperature cooling wind that is discharged from the intercooler is released to the one side on the vehicle width direction and hence does not hit the drive motor which is disposed on the other side in the vehicle width direction.

In the above-described saddle-ridden vehicle according to the second aspect of the invention, it is preferable that the surge tank be disposed in the top-rear of the engine between the intercooler and the drive motor.

According to this mode of the invention, the surge tank which is disposed between the intercooler and the drive motor exercises an effect of interrupting transmission of heat from the intercooler to the drive motor.

In the above-described saddle-ridden vehicle according to the second aspect of the invention, it is preferable that in a top view of the saddle-ridden vehicle the intercooler and the drive motor be disposed between the pair of frame members.

According to this mode of the invention, neither the intercooler nor the drive motor sticks out sideways from the saddle-ridden vehicle, whereby the width of the saddle-ridden vehicle can be decreased.

In the above-described saddle-ridden vehicle according to the second aspect of the invention, it is preferable that the drive motor be disposed under the air cleaner and the surge tank at a position that is distant from the one, located on the other side in the vehicle width direction, of the pair of frame members.

According to this mode of the invention, since a neighborhood of the air cleaner and the surge tank is lower in temperature than a neighborhood of the intercooler, disposing the drive motor under the air cleaner and the surge tank can prevent the temperature of the drive motor becoming high. Furthermore, heat can be dissipated from the drive motor by forming, between the drive motor and the nearby frame member, a space through which a travel wind is to flow.

As described above, the second aspect of the invention makes it possible to prevent the drive motor of the electronically controlled throttle device from being lowered in performance by heat emitted from the intercooler or the heat of a high-temperature cooling wind discharged from the intercooler.

DESCRIPTION OF SYMBOLS

Figure 1:
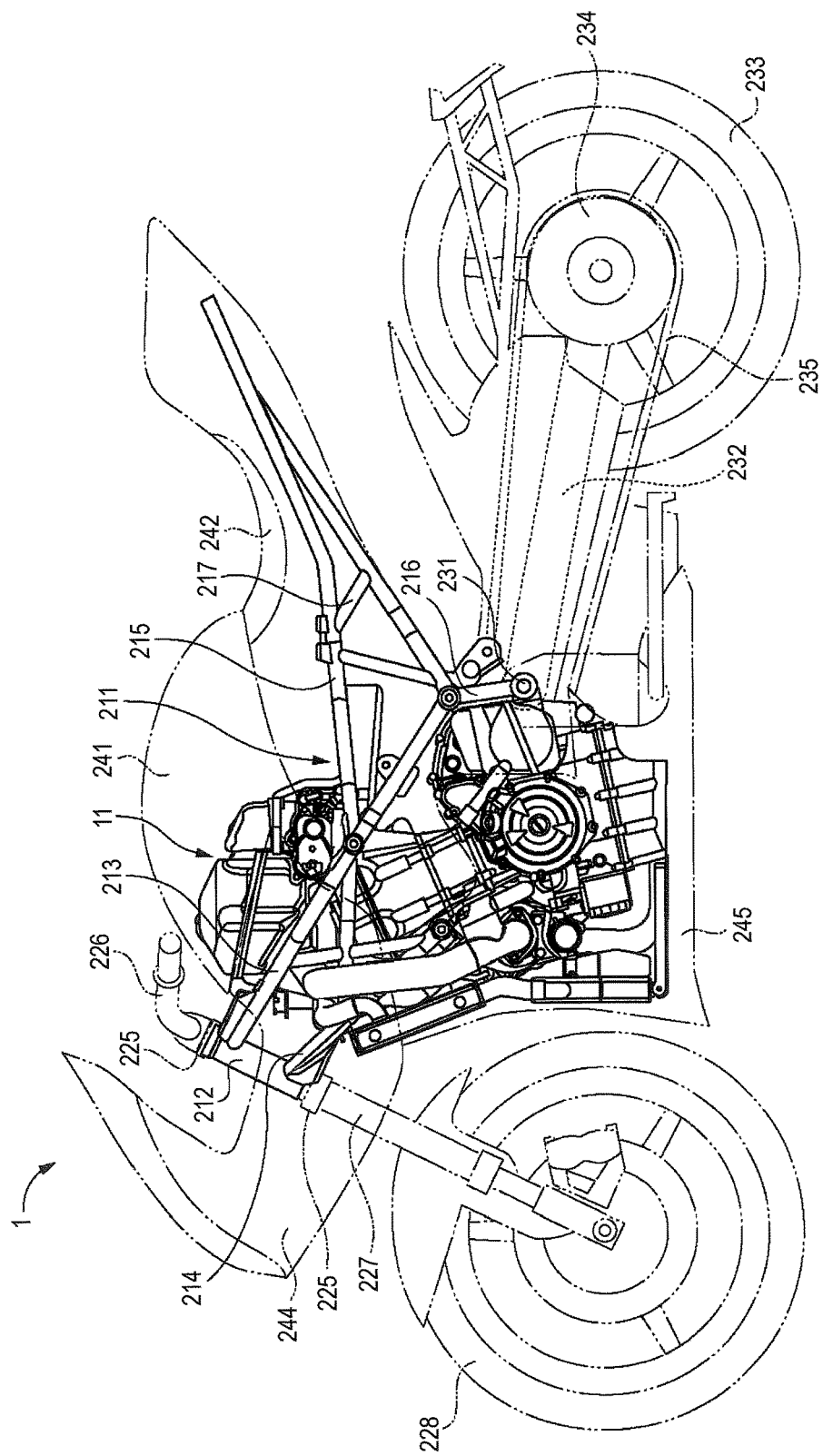
FIG. 1 shows a configuration, common to embodiments of the present invention, of a motorcycle (saddle-ridden vehicle) having a supercharger.

1: Motorcycle (saddle-ridden vehicle)
11: Engine unit
12: Engine
20: Intake port 111: Air intake unit
115: Air cleaner
121: Supercharger
131: Intercooler
141: Exhaust wind duct
142: Exhaust wind introduction portion
144: Intercooler support portion (support portion)
147: Expansion portion
148: Exhaust wind guide portion
149: Exhaust wind outlet
150: Duct unit
154: Surge tank
161: Unit case
171: Electronically controlled throttle device
172: Throttle body
173: Air intake passage
174: Throttle valve
175: Drive motor
211: Vehicle body frame
213: Main frame (frame member)
215: Side frame (frame member)

DETAILED DESCRIPTION OF THE INVENTION (Motorcycle having Supercharger)

Figure 6:
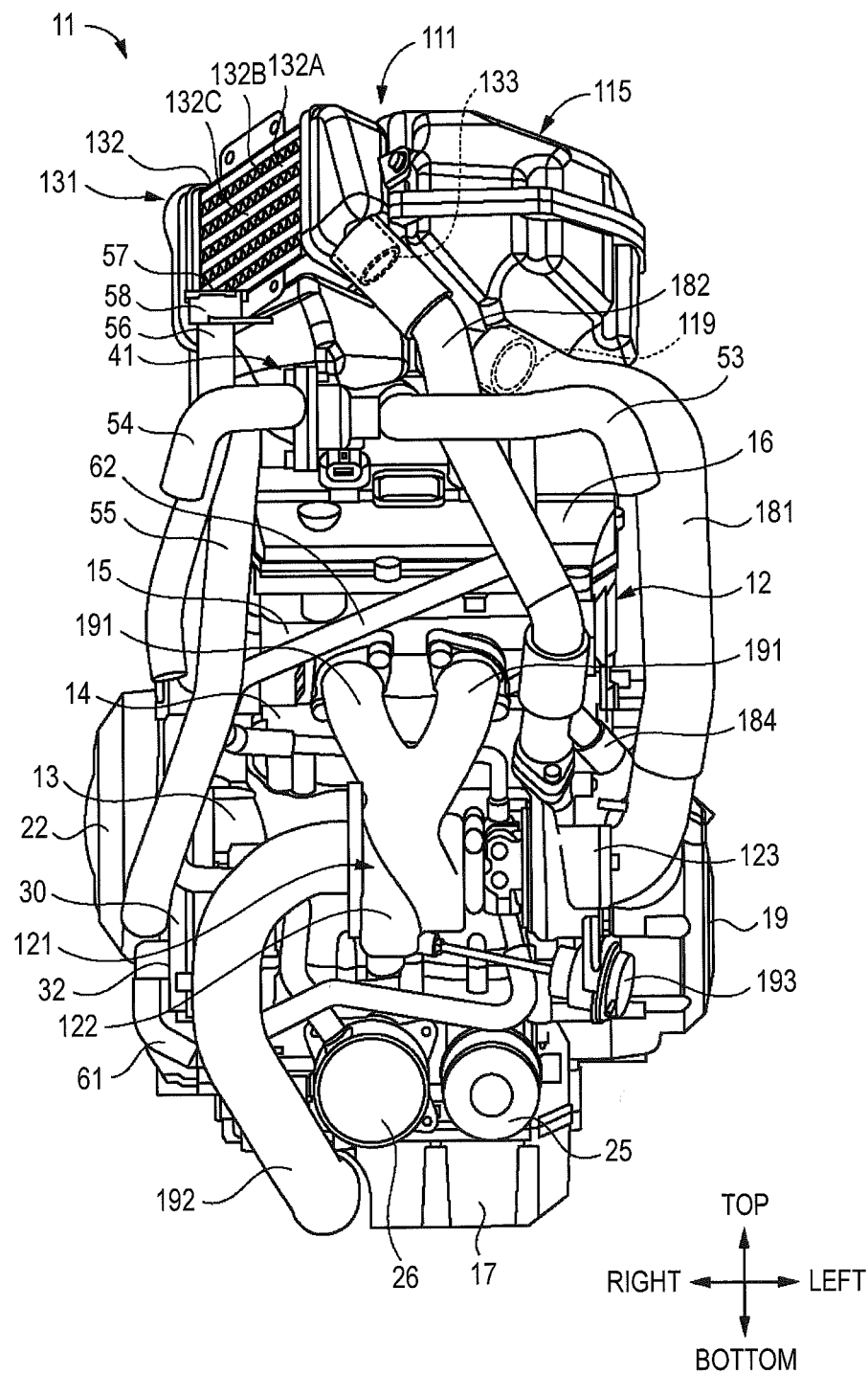
FIG. 6 is a front view of the engine unit shown in FIG. 2 excluding a radiator unit.
Figure 7:
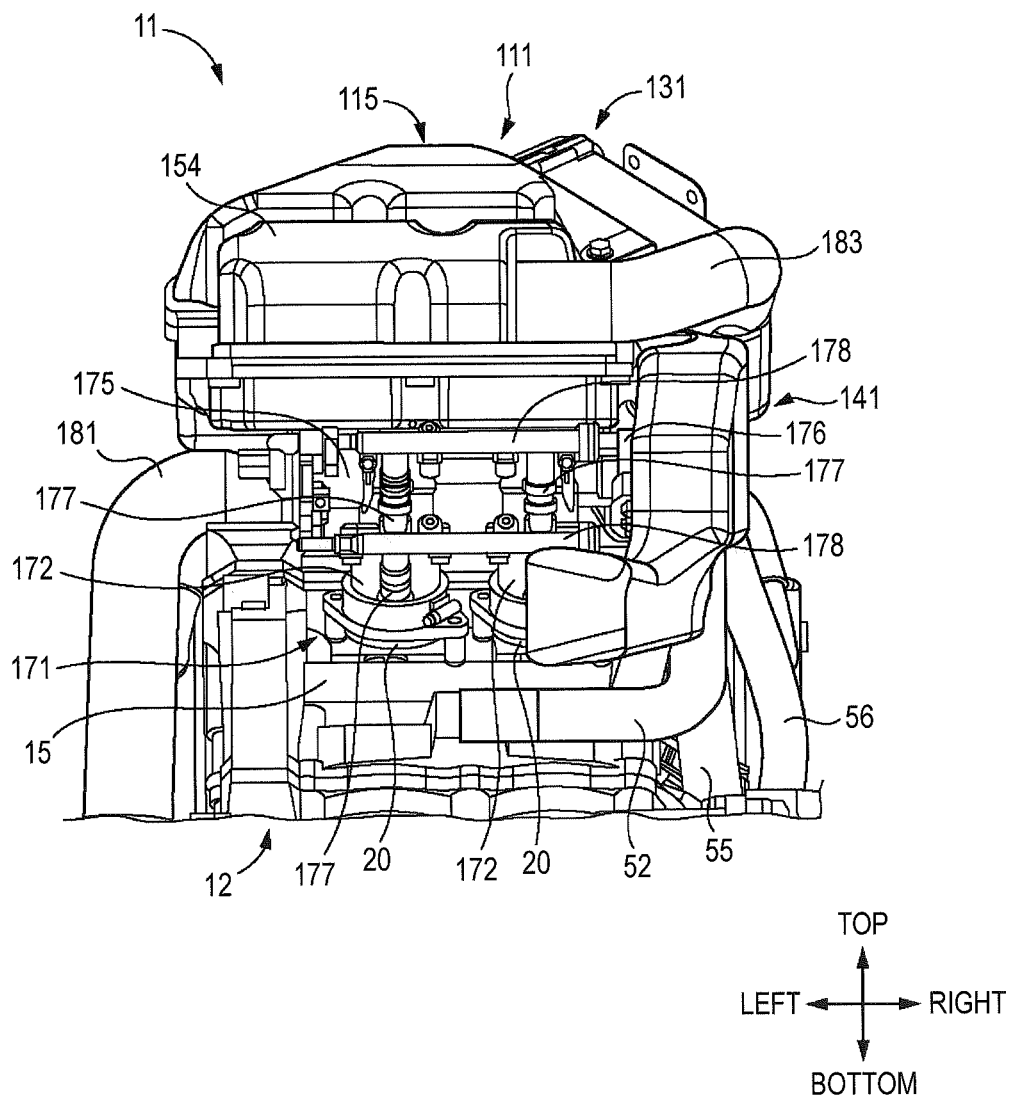
FIG. 7 is a rear view of a top part of the engine unit shown in FIG. 2.

FIG. 1 shows a configuration, common to embodiments of the present invention, of a motorcycle 1 (saddle-ridden vehicle) having a supercharger. In FIG. 1, for convenience of description, components, other than a vehicle body frame 211 and an engine unit 11, of the motorcycle 1 having a supercharger are drawn by two-dot chain lines. FIGS. 2-5 are a front view, a left side view, a right side view, and a plan view, respectively, of the vehicle body frame 211 and the engine unit 11. FIG. 6 is a front view of the engine unit 11 excluding a radiator unit 33. FIG. 7 is a rear view of a top part of the engine unit 11. The forward, rearward, leftward, rightward, upward, and downward directions that will be used in the following description of the embodiments are defined for a rider who is sitting on the seat of the motorcycle 1 having a supercharger.

Referring to FIG. 1, the vehicle body frame 211, common to the embodiments of the invention, of the motorcycle 1 (saddle-ridden vehicle) having a supercharger is constructed by, for example, joining plural steel pipes together. More specifically, the vehicle body frame 211 is equipped with a head pipe 212, a pair of main frames 213, a pair of down tubes 214, a pair of side frames 215, and a pair of pivot frames 216. The head pipe 212 is disposed at a top-front position in the motorcycle 1. The pair of main frames 213 are disposed at left and right positions of the motorcycle 1. Front end portions of the main frames 213 are connected to a top portion of the head pipe 212, and their rear portions extend down rearward. The pair of down tubes 214 are disposed at left and right positions of the motorcycle 1. Front end portions of the down tubes 214 are connected to a bottom portion of the head pipe 212, and their rear portions extend down rearward at a larger inclination than the rear portions of the main frames 213. The pair of side frames 215 are disposed at left and right positions of the motorcycle 1. Front end portions of the side frames 215 are connected to intermediate portions of the down tubes 214, respectively, and their rear portions extend rearward. The pair of pivot frames 216 are joined to rear end portions of the main frames 213, respectively. Reinforcement frames 217 are connected between the main frames 213, the down tubes 214, and the side frames 215. The main frames 213 and the side frames 215 are specific examples of "frame members" (a term used in the claims).

Figure 5:
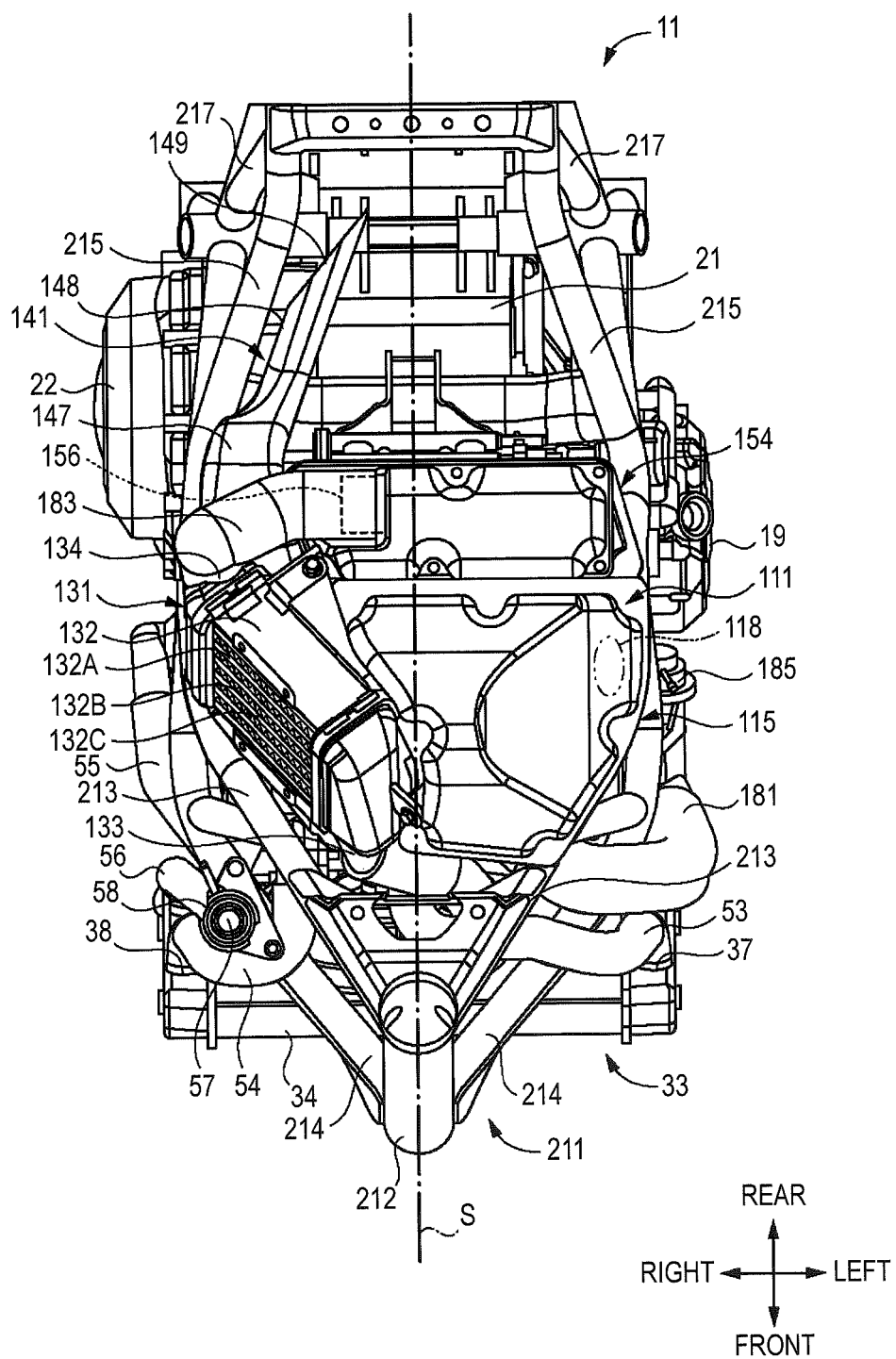
FIG. 5 is a plan view of the vehicle body frame and the engine unit shown in FIG. 2.

As viewed in FIG. 5 which is a plan view, the pair of main frames 213 extend rearward from the head pipe 212 in such a manner that their distance in the left-right direction increases as the position goes rearward. A reference line S of the motorcycle 1 is defined as a center line (in the left-right direction (vehicle width direction)) that extends in the front-rear direction. A front portion of the right main frame 213 extends right-rearward from the head pipe 212 which is located at the center in the left-right direction. Then the right main frame 213 is bent inward gently in a region on the rear-right of a cylinder head 15 of an engine 12 and extends rearward parallel with the reference line S. Then the right main frame 213 is bent inward slightly in a region just in the rear of the plane including the rear surface of the cylinder head 15 and extends rearward so as to be inclined inward a little and thereby approaches the reference line S gradually. On the other hand, the left main frame 213 is approximately left-right symmetrical with the right main frame 213 with respect to the reference line S. Like the pair of main frames 213, the pair of down tubes 214 extend rearward from the head pipe 212 in such a manner that their distance in the left-right direction increases as the position goes rearward.

As for the right side frame 215, its front end portion is connected to the right down tube 214 at a position on the front-right of the engine 12 and its rear portion extends rearward on the right of the engine 12 parallel with the reference line S. Then the right side frame 215 is bent inward slightly in a region just in the rear of the plane including the rear surface of the cylinder head 15 and extends rearward so as to be inclined inward a little and thereby approaches the reference line S gradually. On the other hand, the left side frame 215 is approximately left-right symmetrical with the right side frame 215 with respect to the reference line S.

As shown in FIG. 1, a steering shaft (not shown) is inserted in the head pipe 212, and is provided with steering brackets 225 at its top and bottom. The top steering bracket 225 is provided with a handlebar 226. Top portions of a pair of (left and right) front fork pipes 227 are supported by the top and bottom steering brackets 225, and a front wheel 228 is supported by bottom end portions of the front fork pipes 227.

A front end portion of a swing arm 232 is disposed between and supported by the pair of (left and right) pivot frames 216 via a pivot shaft 231, and a rear wheel 233 is supported by a rear end portion of the swing arm 232. The shaft of the rear wheel 233 is provided with a driven sprocket 234 on which a chain 235 for transmitting motive power of the engine 12 (described later) is wound.

An engine unit 11 is disposed between the front wheel 228 and the rear wheel 233. The engine unit 11 is mainly disposed between the combination of the left main frame 213, the left down tube 214, and the left side frame 215 and the combination of the right main frame 213, the right down tube 214, and the right side frame 213, and is supported by these frames and tubes.

A fuel tank 241 is disposed over the engine unit 11, and a seat 242 is disposed in the rear of the fuel tank 241. An upper cowl 244 is disposed at a top-front position in the motorcycle 1. A lower cowl 245 mainly covers a bottom-front portion of the engine unit 11.

(Engine Unit)

Figure 3:
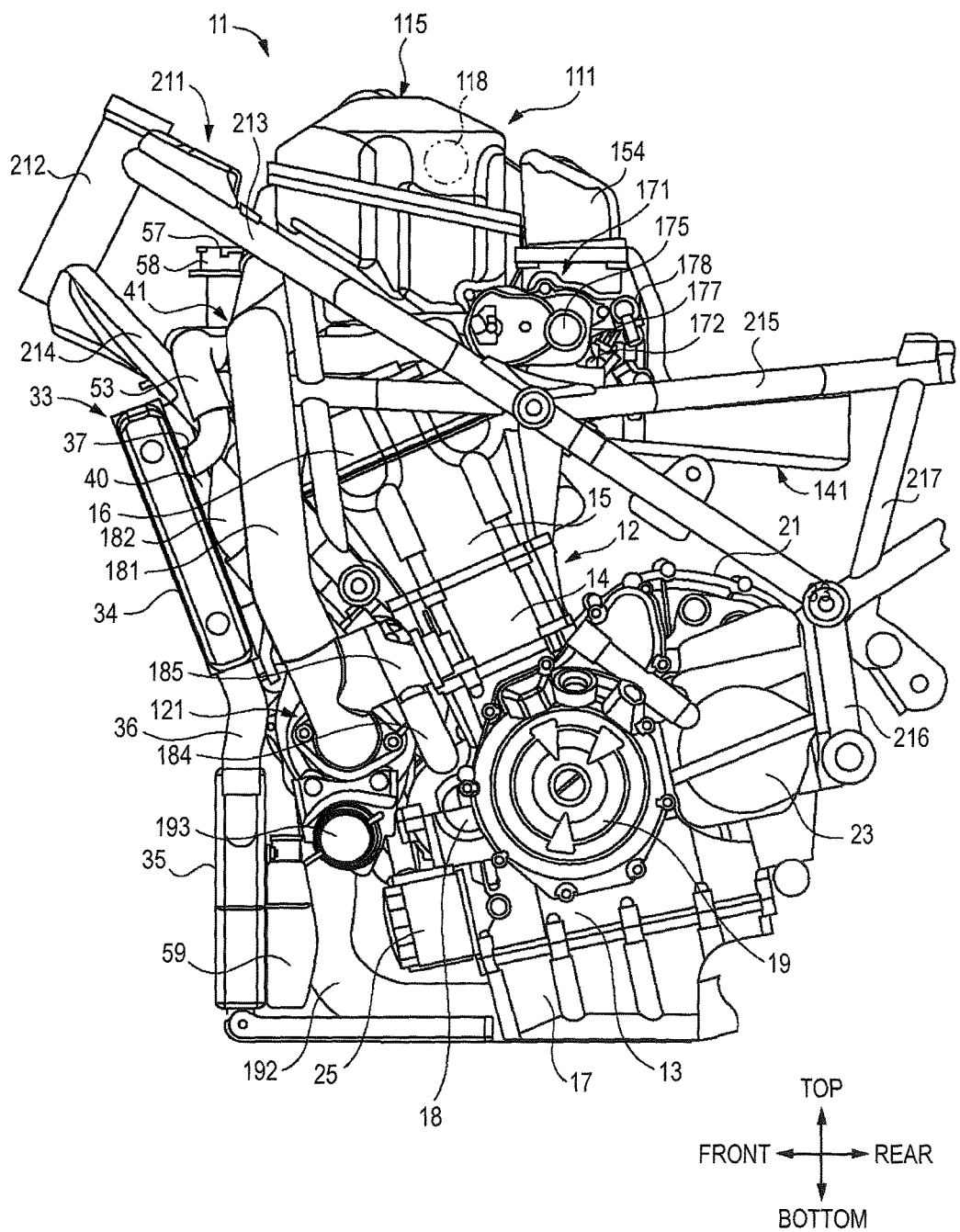
FIG. 3 is a left side view of the vehicle body frame and the engine unit shown in FIG. 2.

As shown in FIG. 3, the engine unit 11 is equipped with the engine 12, part of a drive system, such as a primary speed reducer, a clutch, and a transmission, for transmitting motive power of the engine 12 to the rear wheel 233, a lubrication system for lubricating movable portions of the engine 12, an air intake system (including a supercharger 121) for supplying an air-fuel mixture to the engine 12, part of an exhaust system for discharging exhaust gas generated by combustion of an air-fuel mixture from the engine 12, a cooling system for cooling the engine 12 etc., an AC generator for generating electric power using rotation of a crank shaft, and other things.

The engine 12 used in the embodiment is a water-cooling, parallel 2-cylinder, 4-cycle gasoline engine. The engine 12 has a crank case 13 which houses the crank shaft, cylinders 14 disposed on top of the crank case 13, a cylinder head 15 disposed on top of the cylinders 14, and a cylinder head cover 16 disposed on top of the cylinder head 15.

An oil pan 17 is disposed under the crank case 13. The cylinder axes of the engine 12 are inclined so as to extend up forward. The engine 12 is equipped with a balance shaft for suppressing vibration produced by the movements of pistons. The balance shaft is located in front of the crank shaft and housed in a balancer room 18 which is formed in a front portion of the crank case 13. A magnet room 19 is disposed on the left of the crank case 13 and houses the AC generator.

Figure 4:
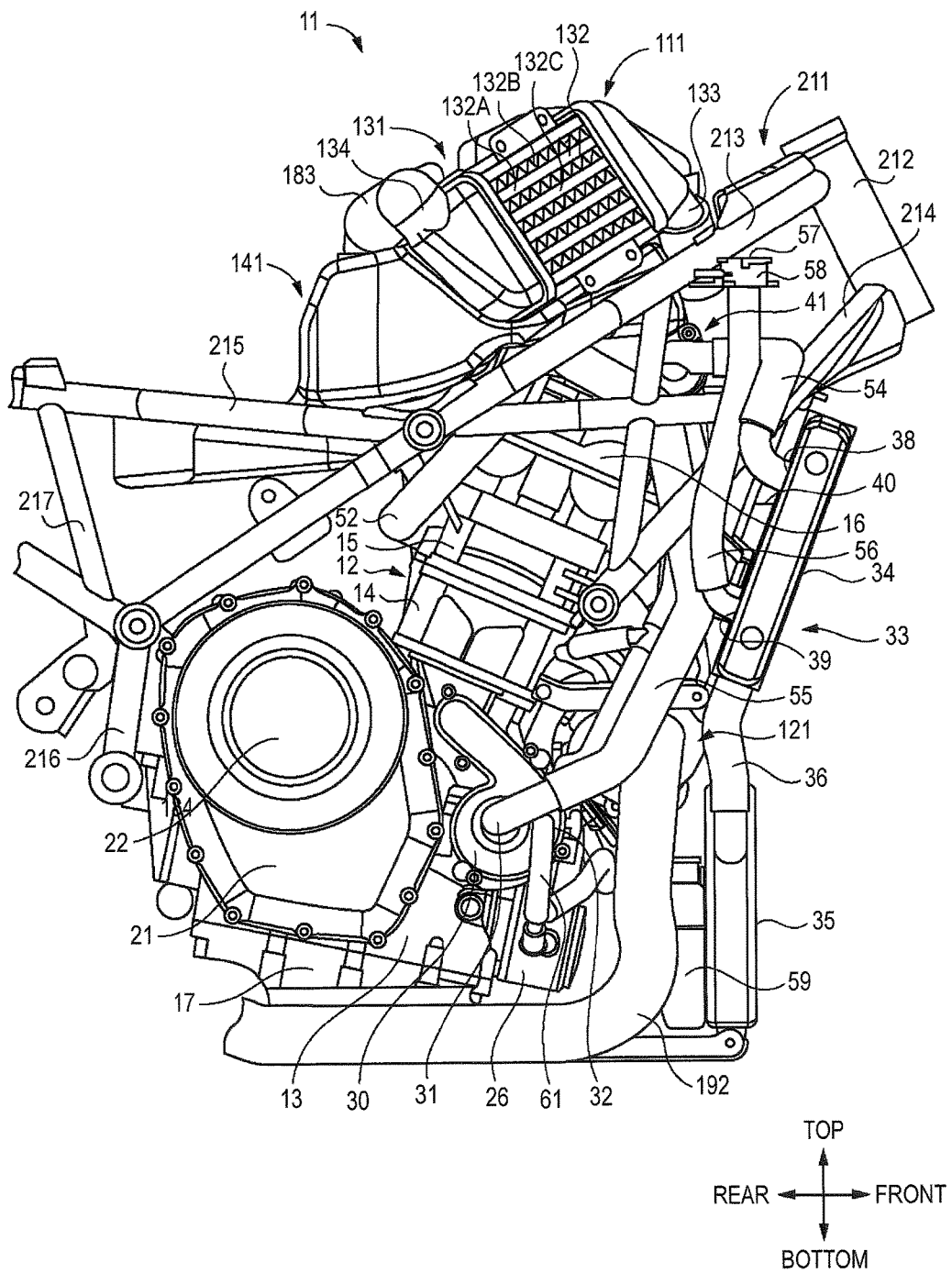
FIG. 4 is a right side view of the vehicle body frame and the engine unit shown in FIG. 2.

As shown in FIG. 4, part of the drive system such as the primary speed reducer, the clutch, and the transmission is disposed in a rear portion of the engine unit 11. More specifically, a transmission case 21 is integral with rear portions of the crank case 13 and the cylinders 14 and houses the primary speed reducer and the transmission. A clutch cover 22 is attached to a right portion of the transmission case 21 and the clutch which is disposed on the right of the transmission is covered with the clutch cover 22. As shown in FIG. 3, a sprocket cover 23 is attached to a left portion of the transmission case 21 and a drive sprocket which is disposed on the left of the transmission is covered with the sprocket cover 23. As shown in FIG. 1, the chain 235 for transmitting drive power of the engine 12 to the rear wheel 233 is wound on the drive sprocket.

As shown in FIG. 6, the lubrication system is equipped with an oil pump, an oil filter 25, and a water-cooling type oil cooler 26. The oil pump pumps up engine oil stored in the oil pan 17 of the engine 12 and supplies it to individual portions of the engine 12. The oil filter 25 filters engine oil, and the oil cooler 26 cools engine oil. The oil filter 25 and the oil cooler 26 are attached to a bottom-front portion of the engine 12.

Figure 2:
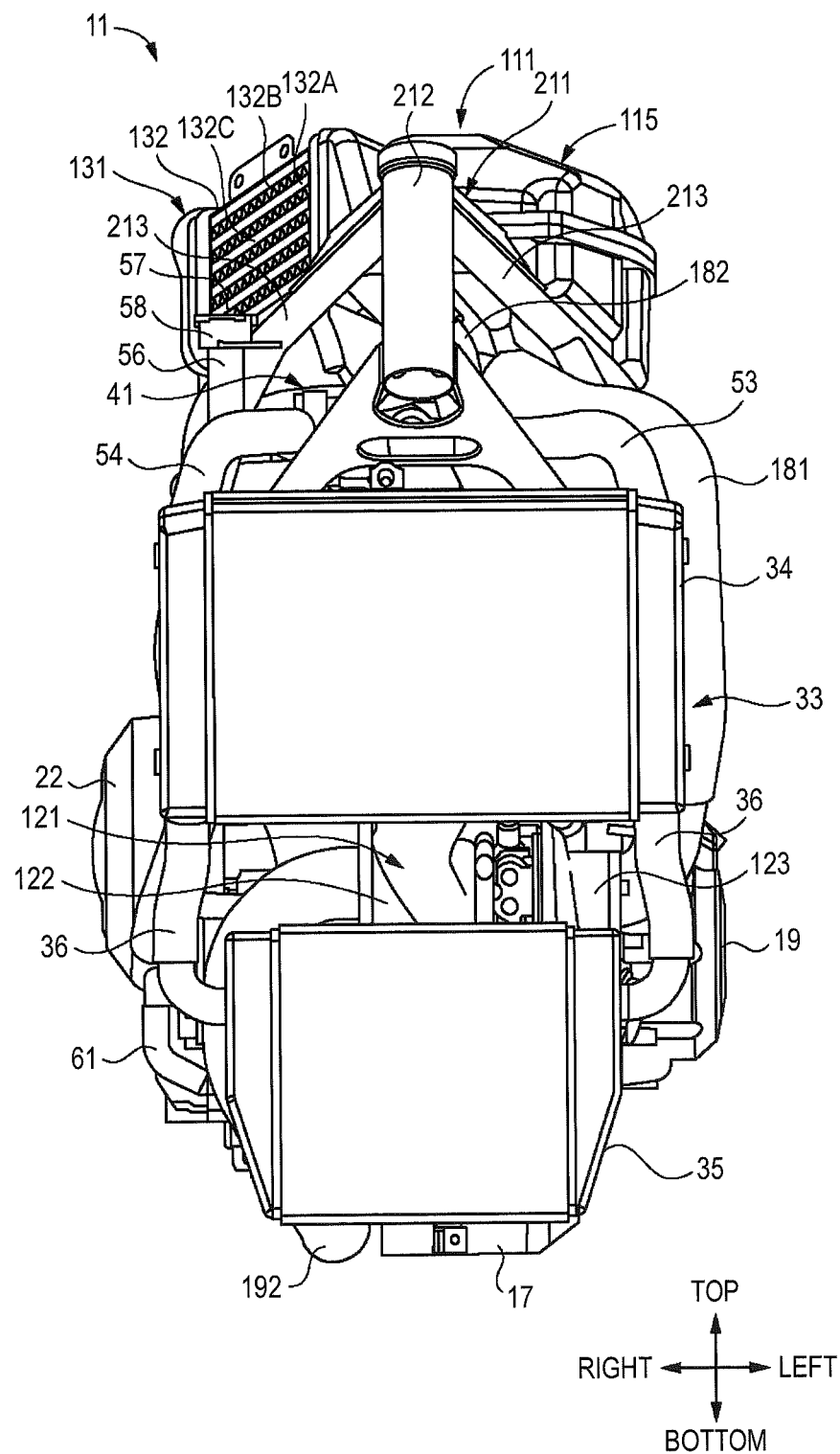
FIG. 2 is a front view of a vehicle body frame and an engine unit of the motorcycle having a supercharger shown in FIG. 1.

As shown in FIG. 4, the cooling system is equipped with a water pump 30, a water jacket (not shown), and the radiator unit 33. The water pump 30 is attached to a right portion of the crank case 13 and discharges cooling water. The water jacket is provided for the cylinders 14 and the cylinder head 15, and cools them by cooling water. The radiator unit 33 is disposed in front of the engine 12, and cools cooling water by radiating heat from the cooling water by receiving a travel wind or driving a radiator fan 40. As shown in FIG. 2, the radiator unit 33 has a top radiator 34 and a bottom radiator 35 which are connected to each other by a pair of connecting hoses 36.

Figure 8:
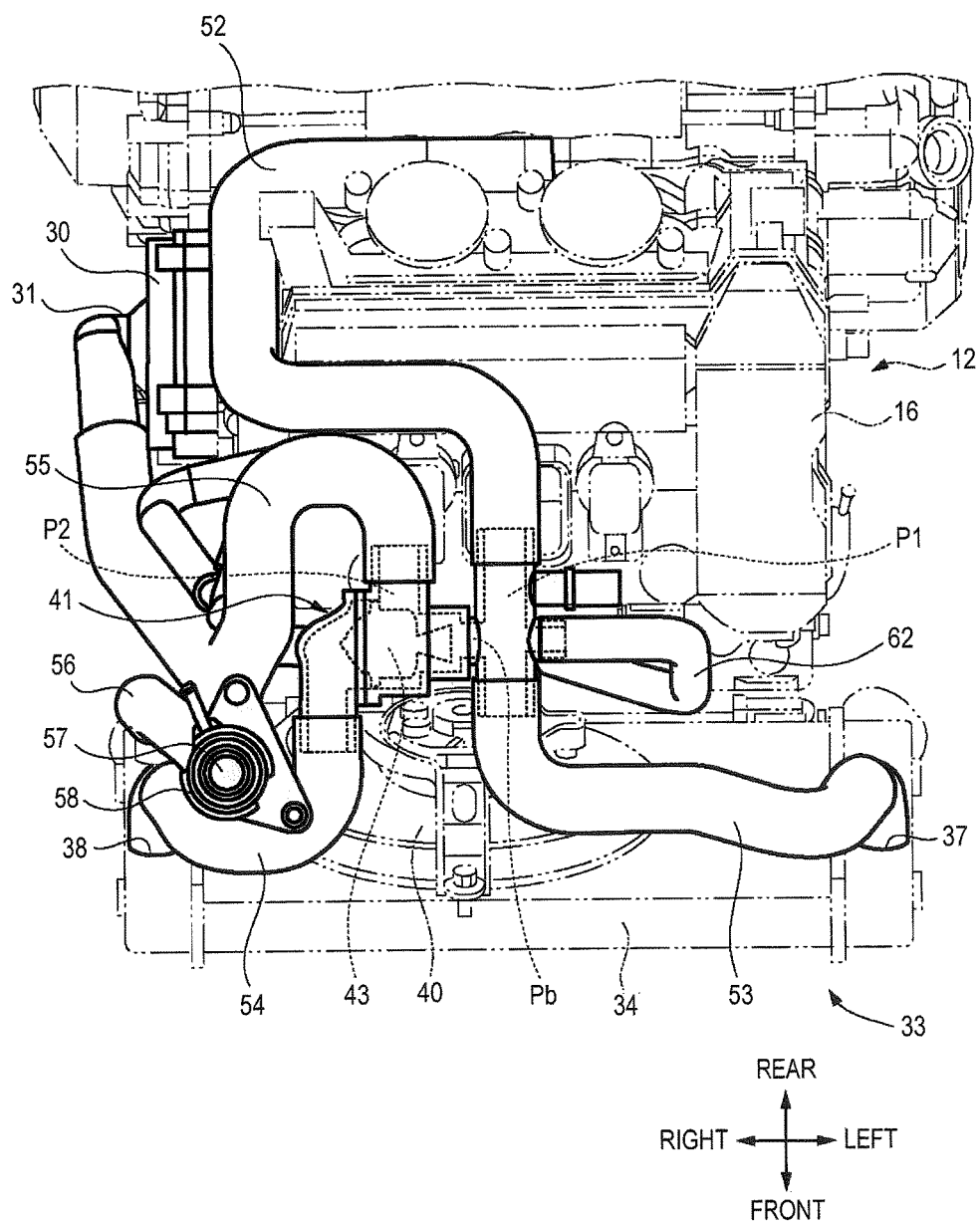
FIG. 8 is a top view of a cooling water flow control unit, a cylinder outlet hose, a radiator inlet hose, a radiator outlet hose, a water pump inlet hose 55, etc.

The cooling system is also equipped with a cooling water flow control unit 41 which adjusts the flow rate of cooling water to flow through the radiator unit 33 according to the cooling water temperature and thereby keeps the cooling water temperature at a proper value. FIG. 8 is a top view of a front part of the engine unit 11 excluding an air cleaner 115, an intercooler 131, a surge tank 154, etc. In FIG. 8, the engine 12, the radiator unit 33, etc. are drawn by two-dot chain lines to highlight the cooling water flow control unit 41, a cylinder outlet hose 52, a radiator inlet hose 53, a radiator outlet hose 54, a water pump inlet hose 55, etc.

As shown in FIG. 8, the cooling water flow control unit 41 is disposed above and on the front-right of the cylinder head cover 16. A passage P1 for supplying, to the radiator unit 33, cooling water that flows out of the water jacket is formed inside the cooling water flow control unit 41 on the left side. The cylinder outlet hose 52 connects the inflow side of the passage P1 and the outflow side of the water jacket, and the radiator inlet hose 53 connects the outflow side of the passage P1 and a radiator inlet 37 of the radiator unit 33.

A passage P2 for returning cooling water, to the water pump 30, cooling water that flows out of the radiator unit 33 is formed inside the cooling water flow control unit 41 on the right side. The radiator outlet hose 54 connects a radiator outlet 38 of the radiator unit 33 and the inflow side of the passage P2, and the water pump inlet hose 55 connects the outflow side of the passage P2 and a cooling water suction inlet 31 of the water pump 30.

A cooling water bypass passage Pb which connects the passages P1 and P2 is also formed inside the cooling water flow control unit 41.

A thermostat 43 is disposed inside the cooling water flow control unit 41. The thermostat 43 adjusts the flow rate of cooling water to flow through the radiator unit 33 according to its temperature. When the cooling water temperature is lower than or equal to a prescribed reference temperature T1, the thermostat 43 controls the flow of cooling water so that it flows through a first circulation path that consists of the water pump 30, the water jacket, the cylinder outlet hose 52, the passage P1, the cooling water bypass passage Pb, the passage P2, and the water pump inlet hose 55.

When the cooling water temperature is higher than a prescribed reference temperature T2 (T2>T1), the thermostat 43 controls the flow of cooling water so that it flows through a second circulation path that consists of the water pump 30, the water jacket, the cylinder outlet hose 52, the passage P1, the radiator inlet hose 53, the radiator unit 33, the radiator outlet hose 54, the passage P2, and the water pump inlet hose 55, that is, so that the cooling water flows through the radiator unit 33.

When the cooling water temperature is higher than or equal to the reference temperature T1 but lower than the reference temperature T2, the thermostat 43 controls the flow of cooling water so that it flows through both of the first circulation path and the second circulation path.

As shown in FIG. 4, a cooling water injection portion 58 having a cooling water injection inlet 57 is disposed on the top-right of the radiator unit 33 and connected, by a water injection hose 56, to a cooling water supply inlet 39 which is formed in the rear surface of the top radiator 34 at a bottom-right position. A reservoir tank 59 for storing cooling water is disposed in the rear of the bottom radiator 35 and connected to, for example, the top radiator 34 by an overflow tube (not shown).

(Structures of Air Intake System and Exhaust System)

As shown in FIGS. 3 and 6, the air intake system is equipped with an air cleaner 115, the supercharger 121, the intercooler 131, an exhaust wind duct 141, the surge tank 154, electronically controlled throttle device 171, and injectors 177.

As shown in FIG. 6, the air cleaner 115, which is a device for filtering and thereby cleaning air for fuel combustion that is taken in from outside, is disposed on the top-left of the engine 12, more specifically, on the top-left of the cylinder head cover 16. A front portion of the air cleaner 115 is located over the supercharger 121. As shown in FIG. 3, the air cleaner 115 has an air suction inlet 118 for taking in external air into the air cleaner 115. The air suction inlet 118 of the air cleaner 115 is provided with an air duct (not shown) for guiding external air to the air suction inlet 118. As shown in FIG. 6, the air cleaner 115 also has an air outlet 119 for causing filtered air to flow out of the air cleaner 115.

As shown in FIG. 3, the supercharger 121 is disposed in front of the engine 12, more specifically, in front of the cylinders 14. The supercharger 121 is disposed above the balancer room 18. As shown in FIG. 6, the supercharger 121 is equipped with a turbine unit 122 having a turbine and a compressor unit 123. The turbine of the turbine unit 122 is driven by exhaust gas of the engine 12, and the compressor unit 123 which is driven by motive power of the turbine compresses air that is supplied via the air cleaner 115. The supercharger 121 is disposed so that the turbine unit 122 and the compressor unit 123 are located on the right side and the left side, respectively. An air intake pipe 181 connects the air outlet 119 of the air cleaner 115 and the compressor unit 123 of the supercharger 121.

The intercooler 131 is a heat exchanger for cooling air that has been compressed by the compressor unit 123 of the supercharger 121 and thereby increased in temperature. As shown in FIG. 6, the intercooler 131 is disposed on the top-right of the engine 12, more specifically, on the top-right of the cylinder head cover 16. A front portion of the intercooler 131 is located over the supercharger 121. The intercooler 131 is disposed on the side opposite to the compressor unit 123 of the supercharger 121 in the left-right direction. The intercooler 131 is located adjacent to the air cleaner 115 on its right side.

The intercooler 131 is of an air cooling type, and is equipped with passages 132A for air compressed by the compressor unit 123 and a heat radiation unit 132 having fins 132B for radiating heat from air compressed by the compressor unit 123 by receiving external air. The heat radiation unit 132 has a receiving surface 132C for receiving external air to radiate heat.

A bottom-front portion of the intercooler 131 is formed with an air inlet 133 for causing air supplied from the compressor unit 123 of the supercharger 121 to flow into the passages 132A of the heat radiation unit 132. As shown in FIGS. 4 and 5, a rear portion of the intercooler 131 is formed with an air outlet 134 for supplying air that has flowed through the passages 132A of the heat radiation unit 132 and has thereby been cooled to the surge tank 154. An air outlet pipe 182 connects the compressor unit 123 of the supercharger 121 and the air inlet 133 of the intercooler 131.

Figure 9:
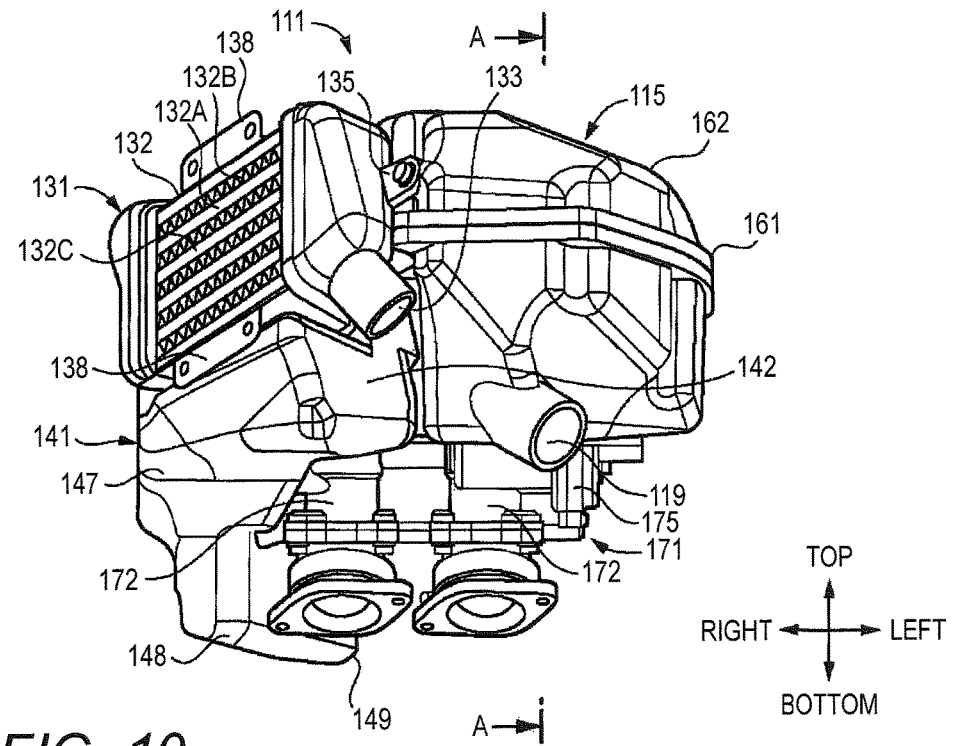
FIG. 9 is a front view of an air intake unit etc. of a motorcycle (saddle-ridden vehicle) having a supercharger according to a first aspect of the invention.

A wind guide duct (not shown) for guiding external air (cooling air) to the heat radiation unit 132 of the intercooler 131 is disposed in front of the intercooler 131. As shown in FIG. 9, the intercooler 131 is provided with wind guide duct attachment portions 138 for connection of the wind guide duct to it.

As shown in FIG. 5, the exhaust wind duct 141 for discharging, to the outside, a cooling wind discharged from the intercooler 131 is disposed in the rear of the intercooler 131. The exhaust wind duct 141 discharges, to the outside, a cooling wind that has been introduced being guided by the wind guide duct, hit the heat radiation unit 132 of the intercooler 131, and passed between the fins 132B of the heat radiation unit 132. A cooling wind passing through the heat radiation unit 132 cools air flowing through the passages 132A of the intercooler 131 and is thereby increased in temperature. The exhaust wind duct 141 determines a position and a direction at and in which to discharge a resulting high-temperature cooling wind to the outside.

A front portion and a rear portion of the exhaust wind duct 141 are located on the top-right of and in the rear of the engine 12, respectively. In a top view of the motorcycle 1, the exhaust wind duct 141 is located between the pair of main frames 213. As viewed in FIG. 4 which is a right side view of the motorcycle 1, the exhaust wind duct 141 extends alongside the right side frame 215 to the rear of the engine 12. The exhaust wind duct 141 is curved gently toward the center line (in the vehicle width direction) and extends so as to come closer to the center line as the position goes rearward. The exhaust wind duct 141 will be described later in more detail.

The surge tank 154 is a device for rectifying a flow of air that has been compressed by the supercharger 121 and cooled by the intercooler 131. As shown in FIG. 5, the surge tank 154 is disposed in the top-rear of the engine 12 so as to be adjacent to the air cleaner 115 from behind. In a top view of the motorcycle 1, the air cleaner 115, the intercooler 131, and the surge tank 154 which are disposed above the engine 12 form a triangle (e.g., a triangle is formed above the engine 12 when the centers of gravity of these three components are connected to each other by straight lines).

Figure 14:
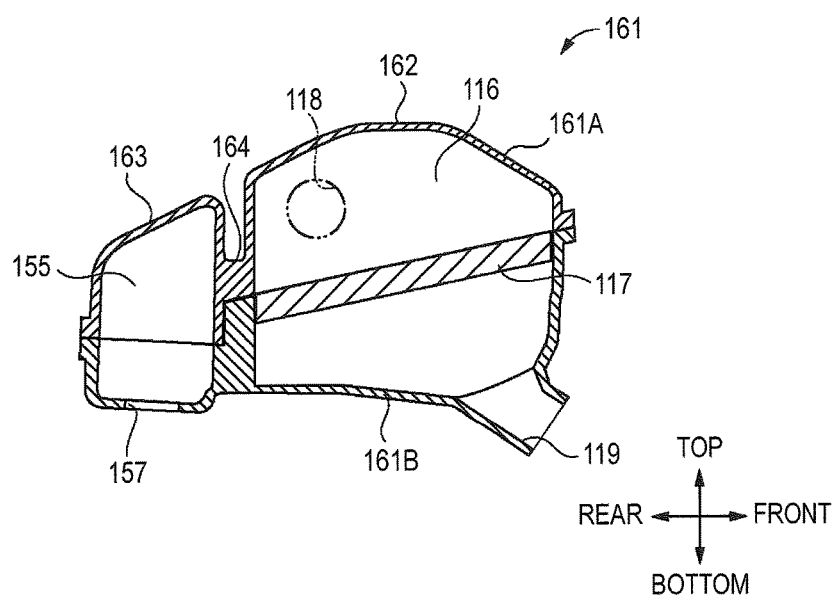
FIG. 14 is a sectional view of a unit case of the air intake unit taken along line A-A in FIG. 9.

A top-right portion of the surge tank 154 is formed with an air inlet 156 for causing air supplied from the intercooler 131 to flow into the surge tank 154. As shown in FIG. 14, a bottom portion of the surge tank 154 is formed with an air outlet 157 for causing air that is stored temporarily in the surge tank 154 to flow out to air intake passages that are formed in respective throttle bodies 172 of the electronically controlled throttle device 171. A connecting pipe 183 connects the air outlet 134 of the intercooler 131 and the air inlet 156 of the surge tank 154. Since the air outlet 134 of the intercooler 131 and the air inlet 156 of the surge tank 154 are close to each other, the connecting pipe 183 which connects them are short.

The electronically controlled throttle device 171 is a device for adjusting the rate of supply, to intake ports 20 of the engine 12, of air that has flown through the intercooler 131 and the surge tank 154. As shown in FIG. 7, the electronically controlled throttle device 171 is equipped with the two throttle bodies 172 which correspond to the two respective intake ports 20 of the engine 12. An air intake passage 173 (see FIG. 22) is formed inside each throttle body 172. The inflow side of the air intake passage 173 is connected to the air outlet 157 of the surge tank 154, and the outflow side of the intake passage 173 is connected to the associated intake ports 20 of the engine 12.

Figure 22:
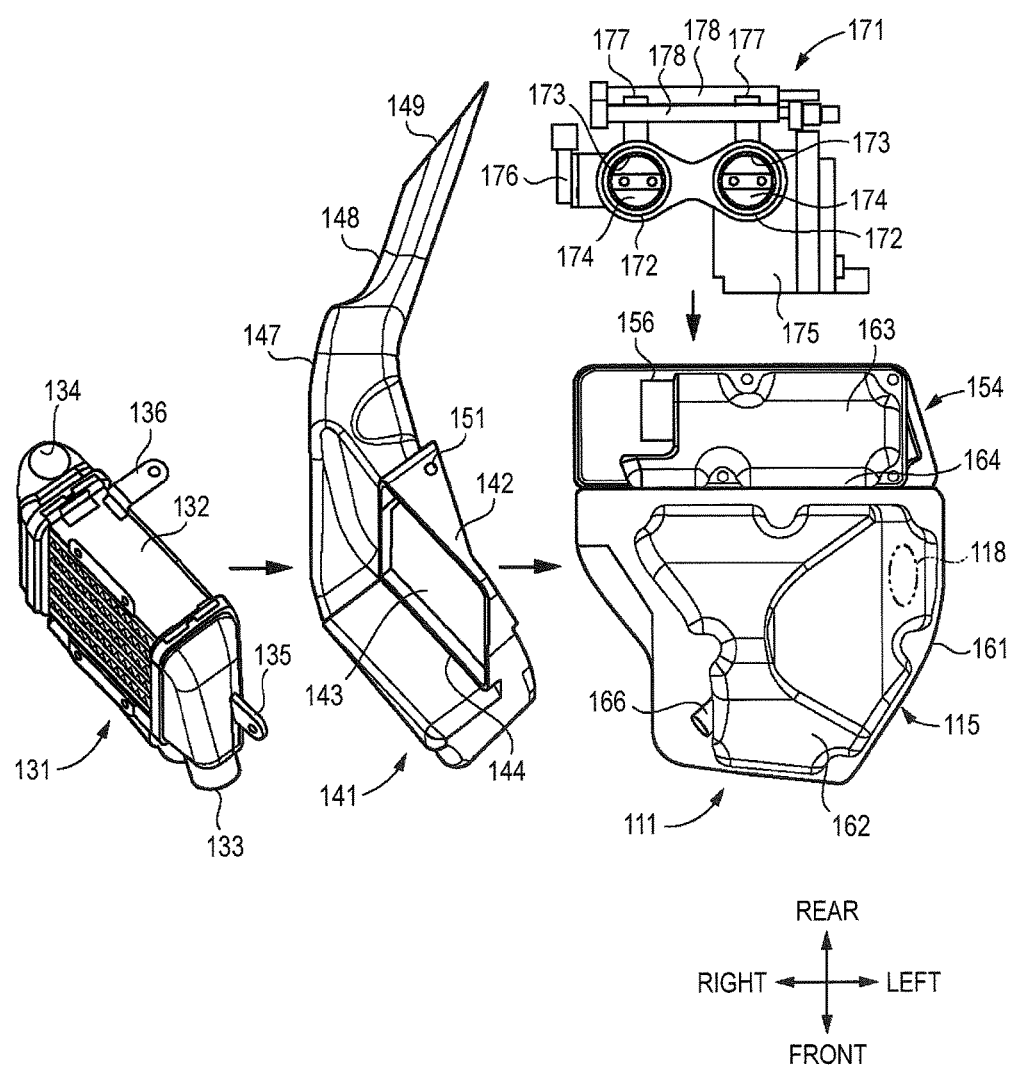
FIG. 22 is an exploded view of the air intake unit etc. shown in FIG. 21.

As shown in FIG. 22, a throttle valve 174 is disposed inside the intake passage 173 of each throttle body 172. The electronically controlled throttle device 171 is also equipped with an electric drive motor 175 for controlling the degree of opening of each throttle valve 174. The motorcycle 1 is equipped with a sensor for detecting an accelerator manipulation amount and a controller for controlling the driving of the drive motor 175. The drive motor 175 operates according to a control signal supplied from this controller.

Figure 25:
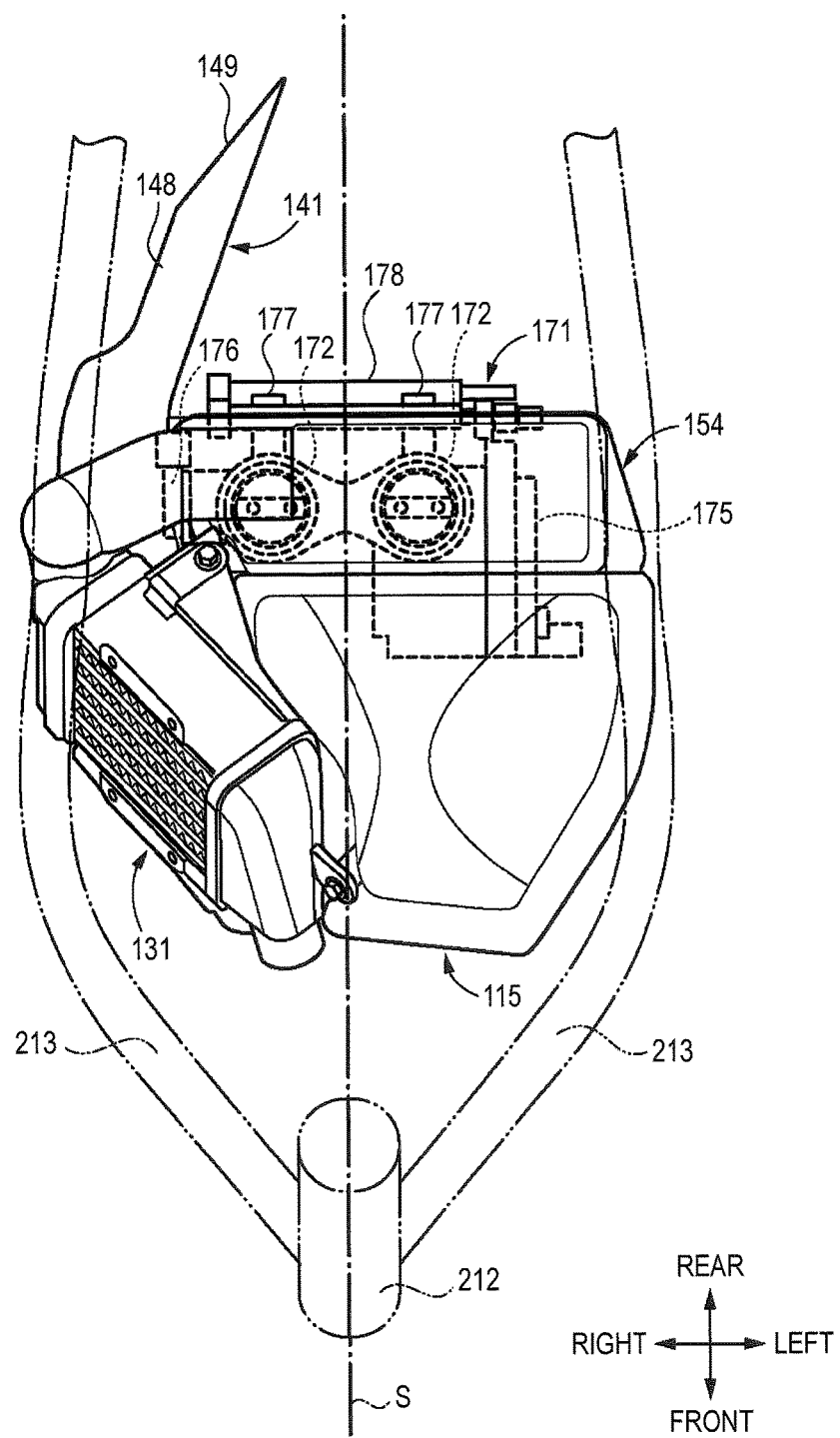
FIG. 25 is a top view illustrating positional relationships between main frames, the intercooler, the drive motor, etc. of the motorcycle (saddle-ridden vehicle) having a supercharger according to the embodiment of the second aspect of the invention.

The two throttle bodies 172 are disposed at positions in the left-right direction corresponding to the positions of the intake ports 20 of the engine 12, respectively. As shown in FIG. 25, the drive motor 175 is disposed at a left position in the electronically controlled throttle device 171 in a region from the front side to the left side of the left throttle body 172. The electronically controlled throttle device 171 is equipped with a throttle position sensor 176 for detecting the degree of opening (valve position) of each throttle valve 174. As shown in FIG. 22, the throttle position sensor 176 is disposed at a right position in the electronically controlled throttle device 171 on the right of the right throttle body 172.

The injectors 177 are devices for injecting fuel into the intake ports 20 of the engine 12. Delivery pipes 178 for supplying fuel from the fuel tank 241 to the injectors 177 are connected to the injectors 177. More specifically, two injectors 177 are provided for each intake port 20 at an upstream position and a downstream position in the air intake passage 173. The two delivery pipes 178 supply fuel to the respective injectors 177 located at the upstream position and the downstream position in each air intake passage 173.

In the thus-constructed air intake system, usually, air that is taken in from the outside passes through the air cleaner 115, the air intake pipe 181, the compressor unit 123 of the supercharger 121, the air outlet pipe 182, the intercooler 131, the connecting pipe 183, the surge tank 154, and the throttle bodies 172 (air intake passages 173) of the electronically controlled throttle device 171 in this order and is then supplied to the intake ports 20 of the engine 12.

As shown in FIG. 3, the air intake system of the motorcycle 1 is equipped with an air bypass pipe 184 which connects the air intake pipe 181 and the air outlet pipe 182 without intervention of the compressor unit 123 of the supercharger 121 and an air bypass valve 185 for switching between passage and shutoff of the air bypass pipe 184. The air bypass valve 185 is opened when the throttle valves 174 are fully closed at the time of, for example, deceleration, and thereby causes the air outlet pipe 182 and the air intake pipe 181 to communicate with each other via the air bypass pipe 184. As a result, compressed air existing downstream of the compressor unit 123 of the supercharger 121 escapes to the upstream side and the pressure at the downstream side of the compressor unit 123 is lowered.

As shown in FIG. 6, the exhaust system is equipped with an exhaust pipe 191 which connects exhaust ports of the engine 12 and the turbine unit 122 of the supercharger 121, a muffler joint pipe 192 which connects the turbine unit 122 of the supercharger 121 and the muffler side, the muffler (not shown), etc. Among these components, the exhaust pipe 191 is part of the engine unit 11. The exhaust pipe 191 is disposed in front of the engine 12 between the exhaust ports and the turbine unit 122. In the embodiment, the exhaust pipe 191 is integral with a housing of the turbine unit 122. More specifically, two branch portions, located on one side, of the exhaust pipe 191 are connected to the two respective exhaust ports of the parallel 2-cylinder engine 12. And one merged portion, located on the other side, of the exhaust pipe 191 is integral with the housing of the turbine unit 122 of the supercharger 121. Alternatively, the exhaust pipe 191 and the housing the turbine unit 122 may be separate members and be connected to each other. On the other hand, one end portion of the muffler joint pipe 192 is connected to the turbine unit 122 of the supercharger 121, and on the other side the muffler joint pipe 192 passes by a bottom-right portion of the engine 12 and extends rearward toward the muffler which is disposed in the bottom-rear of the engine 12.

Exhaust gas that is discharged from the exhaust ports is supplied to the housing of the turbine unit 122 of the supercharger 123 via the exhaust pipe 191. The exhaust gas rotates the turbine of the turbine unit 122. Exhaust gas that is discharged from the turbine unit 122 is supplied to the muffler via the muffler joint pipe 192 and discharged to the outside from the muffler.

The turbine unit 122 of the supercharger 123 is provided with a waste gate valve 193. A gate for causing part of exhaust gas to flow from the exhaust pipe 191 to the muffler joint pipe 192 instead of being supplied to the turbine. The waste gate valve 193 adjusts the rate of inflow of exhaust gas to the turbine by adjusting the degree of opening of this gate.

(Air Intake Unit and Exhaust Wind Duct)

Among the components of the above-described air intake system, the air cleaner 115, the intercooler 131, an exhaust wind introduction portion 142 of the exhaust wind duct 141, and the surge tank 154 are integrated into a single unit, which will be referred to as an "air intake unit 111" in the following description.

FIGS. 9-13 are a front view, a left side view, a right side view, a plan view, and a rear view, respectively, of the air intake unit 111 and the electronically controlled throttle device 171. FIG. 14 is a sectional view of a unit case 161 of the air intake unit 111 taken along line A-A in FIG. 9.

Figure 10:
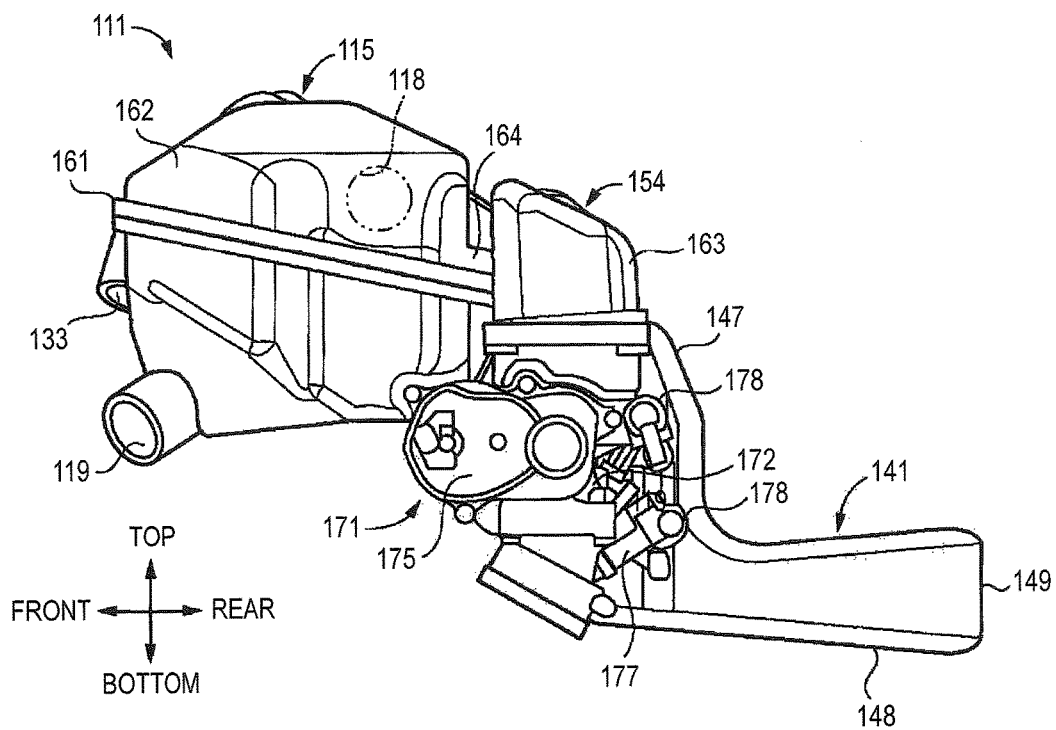
FIG. 10 is a left side view of the air intake unit etc. shown in FIG. 9.
Figure 11:
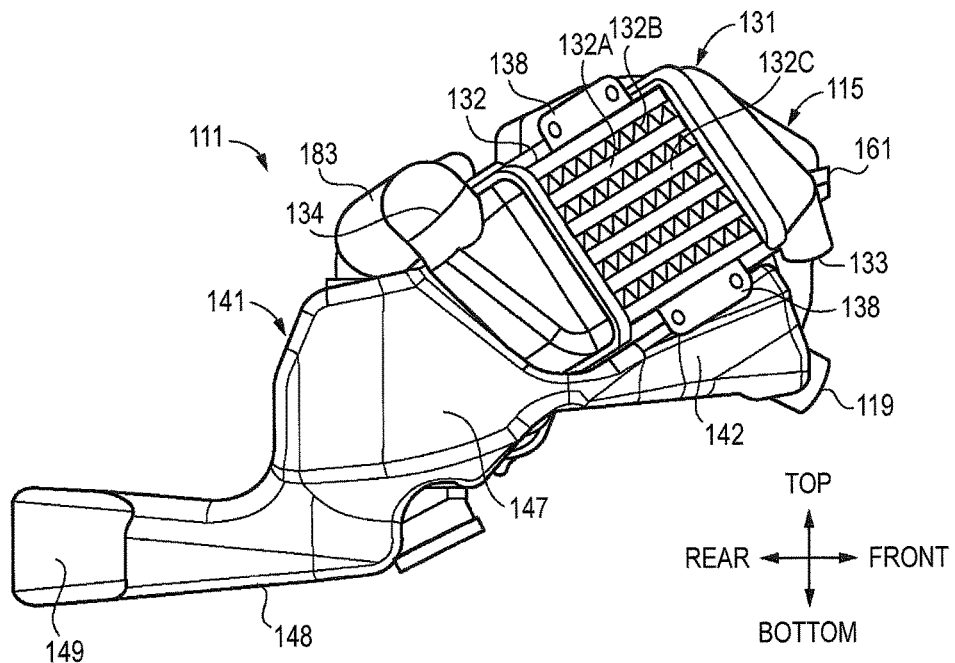
FIG. 11 is a left side view of the air intake unit etc. shown in FIG. 9.
Figure 12:
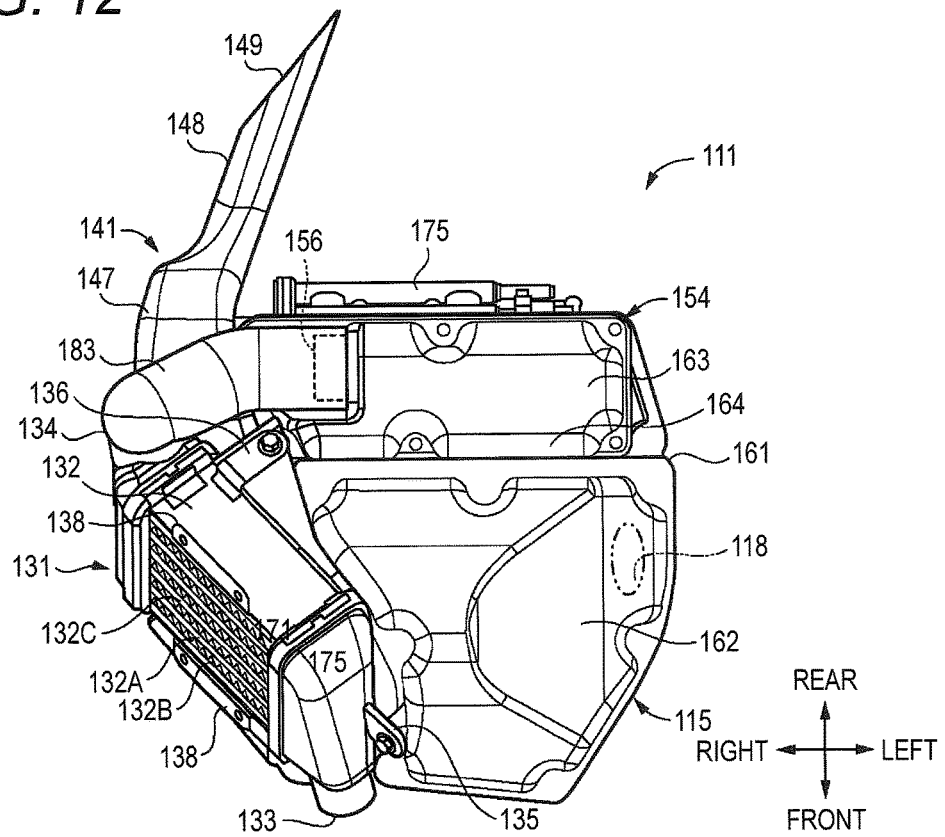
FIG. 12 is a plan view of the air intake unit etc. shown in FIG. 9.
Figure 13:
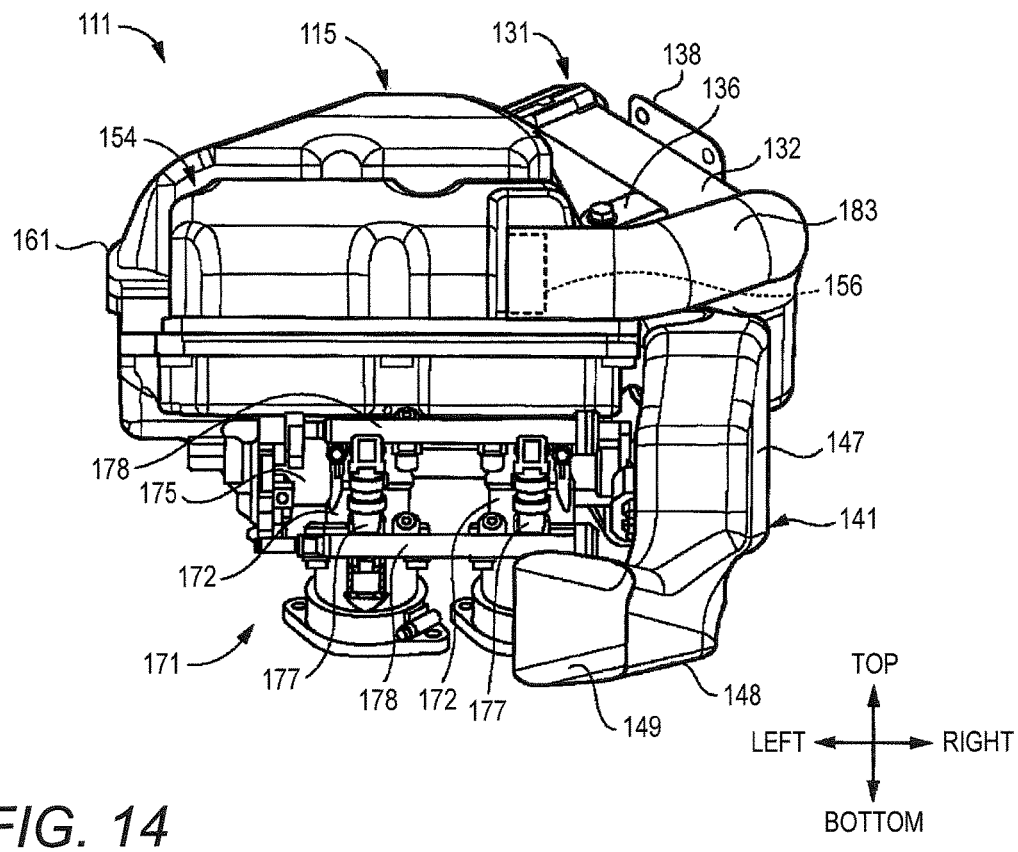
FIG. 13 is a rear view of the air intake unit etc. shown in FIG. 9.

As shown in FIG. 10, in the air intake unit 111, the surge tank 154 is disposed in the rear of the air cleaner 115. More specifically, the air intake unit 111 is equipped with the unit case 161 which is formed by integrating a case of the air cleaner 115 and an outer shell of the surge tank 154. A front portion of the unit case 161 is a cleaner case portion 162 which corresponds to the case of the air cleaner 115. A rear portion of the unit case 161 is a tank portion 163 which constitutes the outer shell of the surge tank 154. In the unit case 161, a link portion 164 which connects the cleaner case portion 162 and the tank portion 163 is formed between them.

As shown in FIG. 14, in the unit case 161, the cleaner case portion 162 is shaped like a hollow box and a cleaner room 116 is formed inside it. An air filter 117 for filtering air is provided inside the cleaner room 116. The left wall of the cleaner case portion 162 is formed with the air inlet 118 (drawn schematically by a two-dot chain line). The position of the air inlet 118 can be set as appropriate. A bottom-front portion of the cleaner case portion 162 is formed with the air outlet 119.

In the unit case 161, the tank portion 163 is shaped like a hollow box and a rectification room 155 is formed inside it. A right portion of the tank portion 163 is formed with the air inlet 156 (see FIGS. 12 and 15), and a bottom portion of the tank portion 163 is formed with the air outlet 157. In the unit case 161, the cleaner room 116 of the cleaner case portion 162 and the rectification room 155 of the tank portion 163 are separated rooms that do not communicate with each other.

Figure 15:
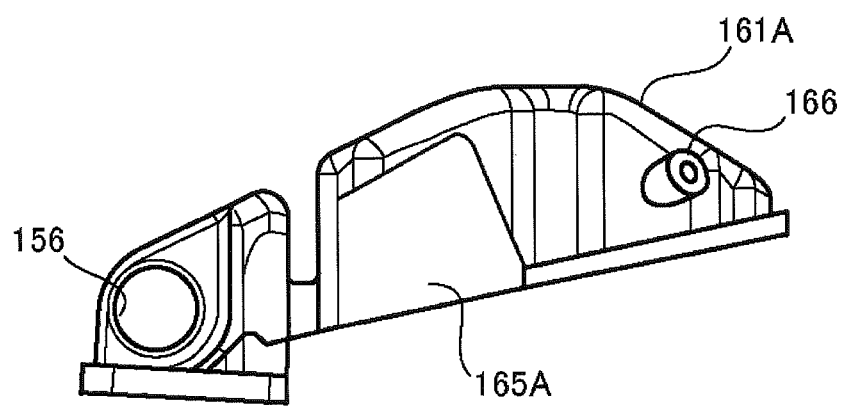
FIG. 15 shows a case lid and a case body of the unit case of the air intake unit of the motorcycle (saddle-ridden vehicle) having a supercharger according to the first aspect of the invention.
Figure 15:
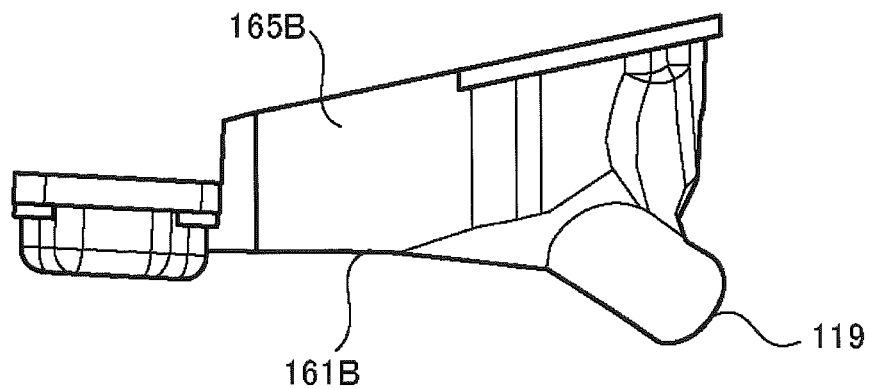

The unit case 161 is equipped with a case lid 161A and a case body 161B which are a top portion and a bottom portion of the unit case 161, respectively. Parts (1) and (2) of FIG. 15 show the case lid 161A and the case body 161B, respectively. As shown in FIG. 15, the case lid 161A and the case body 161B are separate members. Each of the case lid 161A and the case body 161B is formed by resin molding.

As shown in part (1) of FIG. 15, the case lid 161A is composed of a top portion of the cleaner case portion 162, a top portion of the tank portion 163, and a top portion of the link portion 164. The right surface of the case lid 161A is formed with has a duct attachment surface 165A to which an upper portion 142A of the exhaust wind introduction portion 142 of the exhaust wind duct 141 is fixed.

The case body 161B is composed of a bottom portion of the cleaner case portion 162, a bottom portion of the tank portion 163, and a bottom portion of the link portion 164. The right surface of the case body 161B has a duct attachment surface 165B to which a lower portion 142B of the exhaust wind introduction portion 142 of the exhaust wind duct 141 is fixed.

In the air intake unit 111, the intercooler 131 is attached to a right portion of the air cleaner 115 via the exhaust wind introduction portion 142 of the exhaust wind duct 141.

Figure 16:
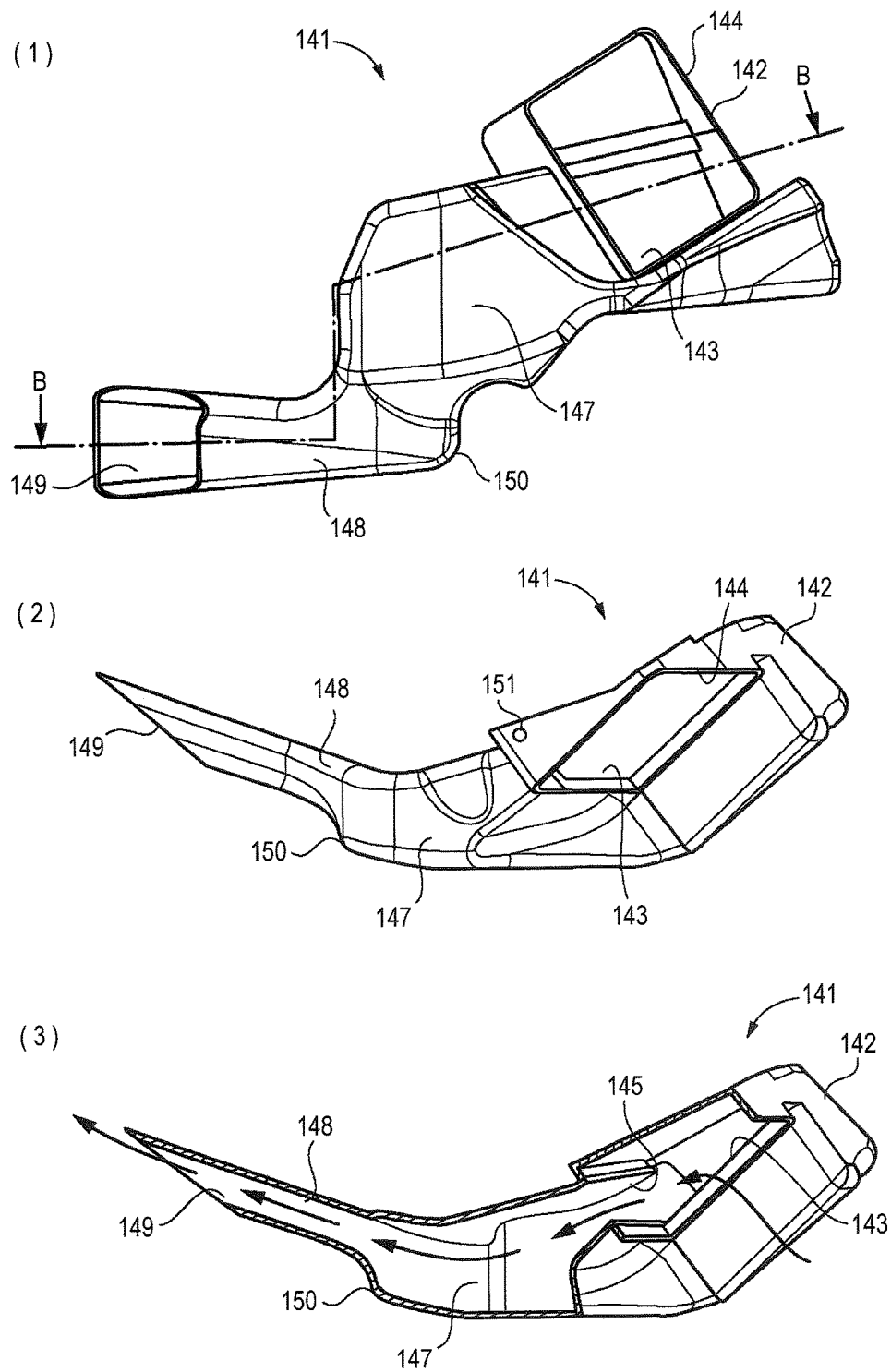
FIG. 16 shows an exhaust wind duct of the air intake unit of the motorcycle (saddle-ridden vehicle) having a supercharger according to the first aspect of the invention.

Now, a structure of the exhaust wind duct 141 will be described. Part (1) of FIG. 16 is a right side view of the exhaust wind duct 141, part (2) of FIG. 16 is a plan view of the exhaust wind duct 141, and part (3) of FIG. 16 is a sectional view of the exhaust wind duct 141 taken along line B-B in part (1) of FIG. 16. As shown in part (1) of FIG. 16, the exhaust wind duct 141 is equipped with the exhaust wind introduction portion 142, an expansion portion 147, and an exhaust wind guide portion 148.

The exhaust wind introduction portion 142 is a front portion of the exhaust wind duct 141, and a cooling wind discharged from the intercooler 131 is introduced into the exhaust wind introduction portion 142. A front portion of the exhaust wind introduction portion 142 is formed with an exhaust wind inlet 143 which is open to the front-right side. The circumferential wall of the exhaust wind inlet 143 has an intercooler support portion 144 which supports the intercooler 131. For example, the intercooler support portion 144 is shaped like a rectangle so as to conform to the shape of the intercooler 131. A rear portion of the exhaust wind introduction portion 142 is formed with an exhaust wind communication hole 145 which is open to the rear side. A passage that causes a cooling wind to flow from the exhaust wind inlet 143 to the exhaust wind communication hole 145 is formed in the exhaust wind introduction portion 142.

The expansion portion 147 is an intermediate portion, in the front-rear direction, of the exhaust wind duct 141; that is, the expansion portion 147 is formed between the exhaust wind introduction portion 142 and the exhaust wind guide portion 148. A passage for causing a cooling wind to flow from the exhaust wind introduction portion 142 toward the exhaust wind guide portion 148 is formed in the expansion portion 147. The inflow side of the passage is connected to the exhaust wind communication hole 145, and the outflow side of the passage is connected to a passage formed in the exhaust wind guide portion 148. The flow passage area of an intermediate portion, between the inflow end and the outflow end, of the passage formed in the expansion portion 147 is larger than that of the passage at each of the inflow end and the outflow end. That is, the passage formed in the expansion portion 147 is wider than the passages in front of and in the rear of it.

The exhaust wind guide portion 148 is a rear portion of the exhaust wind duct 141, and guides a cooling wind that has been introduced to the exhaust wind introduction portion 142 and flown through the expansion portion 147 so that it goes away from the engine 12 rearward and toward the center line, in the vehicle width direction, of the motorcycle 1. A passage for a cooling wind that flows out of the expansion portion 147 is formed in the exhaust wind guide portion 148. A rear end portion of the exhaust wind guide portion 148 is formed with an exhaust wind outlet 149 for discharging a cooling wind to the outside.

A cooling wind that has been introduced by the wind guide duct hits the receiving surface 132C of the radiation unit 132 of the intercooler 131 which is supported by the intercooler support portion 144 of the exhaust wind introduction portion 142, passes between the fins 132B of the radiation unit 132, and flows into the exhaust wind inlet 143. As indicated by arrows in part (3) of FIG. 16, the cooling wind that has flown into the exhaust wind inlet 143 flows to the passage formed in the exhaust wind introduction portion 142 from the exhaust wind inlet 143, flows into the expansion portion 147 via the exhaust wind communication hole 145, then flows through the passage formed in the exhaust wind guide portion 148, and is finally discharged to the outside from the exhaust wind outlet 149.

Figure 17:
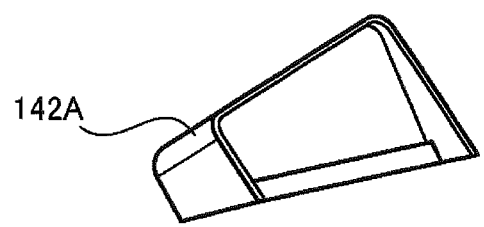
FIG. 17 shows an upper portion, a lower portion, and a duct unit of the exhaust wind duct shown in FIG. 16.
Figure 17:
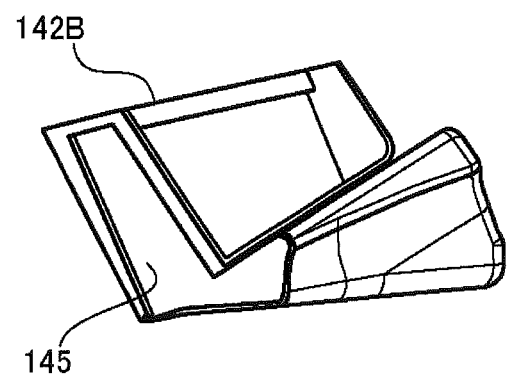
Figure 17:
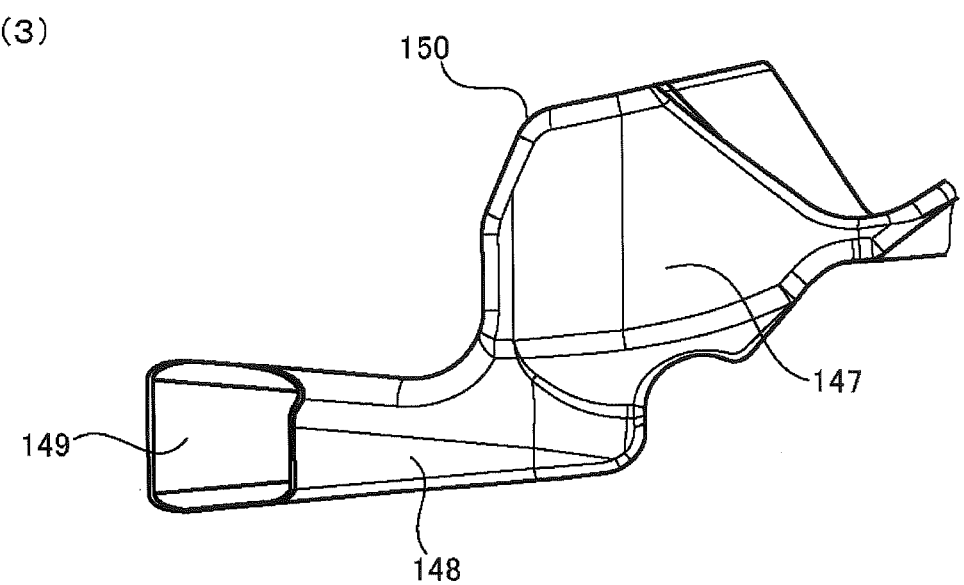

In the exhaust wind duct 141, exhaust wind introduction portion 142 and the integrated assembly of the expansion portion 147 and the exhaust wind guide portion 148 are separate members. In the following description, the combination of the expansion portion 147 and the exhaust wind guide portion 148 will be referred to as a "duct unit 150." The exhaust wind introduction portion 142 has the upper portion 142A and the lower portion 142B, which are a top portion and a bottom portion of the exhaust wind introduction portion 142, respectively, and hence are separate members. Parts (1)-(3) of FIG. 17 show the upper portion 142A, the lower portion 142B, and the duct unit 150 of the exhaust wind introduction portion 142, respectively.

Figure 18:
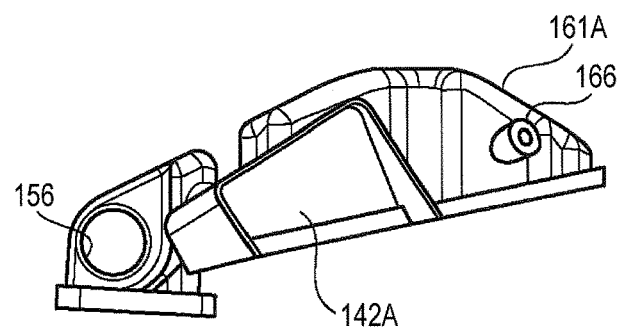
FIG. 18 illustrates a first step of an assembling process of the air intake unit of the motorcycle (saddle-ridden vehicle) having a supercharger according to the first aspect of the invention.
Figure 18:
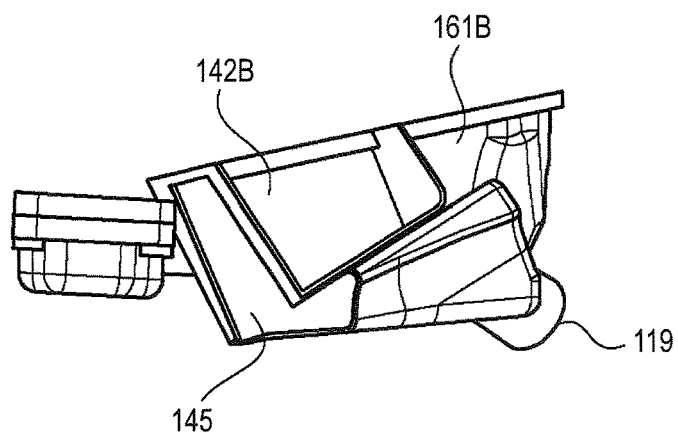
Figure 19:
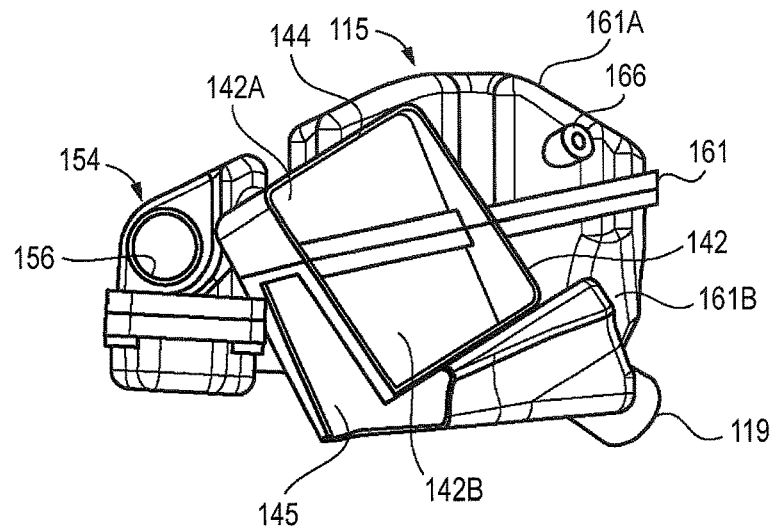
FIG. 19 illustrates a second step of the assembling process of the air intake unit of the motorcycle (saddle-ridden vehicle) having a supercharger according to the first aspect of the invention.
Figure 20:
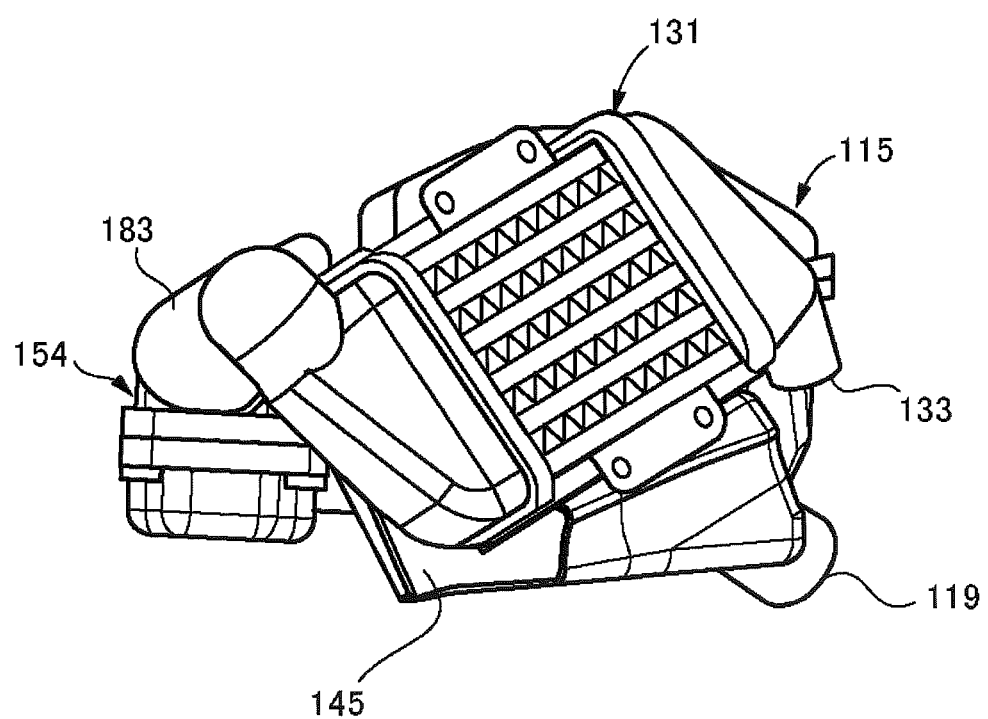
FIG. 20 illustrates a third step of the assembling process of the air intake unit of the motorcycle (saddle-ridden vehicle) having a supercharger according to the first aspect of the invention.

FIGS. 18-20 show an assembling method of the air intake unit 111. The air intake unit 111 is assembled according to the following procedure. First, as shown in part (1) of FIG. 18, the upper portion 142A of the exhaust wind introduction portion 142 is fixed to the duct attachment surface 165A (see part (1) of FIG. 15) of the case lid 161A of the unit case 161 by welding, bolt screwing, locking, or the like. Furthermore, as shown in part (2) of FIG. 18, the lower portion 142B of the exhaust wind introduction portion 142 is fixed to the duct attachment surface 165B (see part (2) of FIG. 15) of the case body 161B of the unit case 161 by welding, bolt screwing, locking, or the like. Then, as shown in FIG. 19, the case lid 161A to which the upper portion 142A is fixed and the case body 161B to which the lower portion 142B is fixed are attached to each other and fixed to each other using bolts, adhesive, or the like. The upper portion 142A and the lower portion 142B are also connected and fixed to each other by attaching and fixing the case lid 161A to the case body 161B.

Subsequently, as shown in FIG. 20, the intercooler 131 is attached to the intercooler support portion 144 of the exhaust wind introduction portion 142. The intercooler 131 is fixed to the unit case 161 and the exhaust wind introduction portion 142 using bolts or the like. Then the connecting pipe 183 is set between the air outlet 134 of the intercooler 131 and the air inlet 156 of the surge tank 154 and attached to them. Finally, the duct unit 150 of the exhaust wind duct 141 is attached to the exhaust wind introduction portion 142.

A structure for fixing the intercooler 131 to the unit case 161 and the exhaust wind introduction portion 142 will be described below. The intercooler 131 is provided with fixing portions 135 and 136 (see FIG. 12), the exhaust wind introduction portion 142 is formed with an attachment hole 151 (see part (2) of FIG. 16), and the upper portion 161A of the unit case 161 is formed with an attachment portion 166 (see part (1) of FIG. 15). The intercooler 131 is attached to the intercooler support portion 144 by fixing the fixing portion 135 to the attachment portion 166 using a bolt, for example, and fixing the fixing portion 136 to the attachment hole 151 using a bolt, for example. As a result of the intercooler 131's being attached in this manner, the exhaust wind introduction portion 142 is interposed between the air cleaner 115 and the intercooler 131.

Alternatively, the intercooler 131 and the intercooler support portion 144 may be provided with respective locking mechanisms. In this case, the fixing portions 135 and 136 are fixed to the attachment portion 166 and the attachment hole 151 after the intercooler 131 is locked on the intercooler support portion 144 using the above locking mechanisms. With this structure, the intercooler 131 can be fixed to the air intake unit 111 strongly.

As shown in FIGS. 3 and 4, the air intake unit 111 is attached to, for example, the main frames 213 and disposed over the engine 12. It is preferable that the air intake unit 111 be attached to the main frames 213 in a state that the duct unit 150 is not attached to the exhaust wind introduction portion 142, that is, in the state shown in FIG. 20. That is, it is preferable that the duct unit 150 be attached to the exhaust wind introduction portion 142 of the air intake unit 111 after the air intake unit 111 to which the duct unit 150 is not attached is attached to the main frames 213 and the duct unit 150 be then supported by, for example, the right side frame 215 via a support member (not shown).

As viewed in FIG. 5 which is a top view of the motorcycle 1, the air intake unit 111 is disposed between the main frames 213. When the air intake unit 111 has been attached to the main frames 213, the air cleaner 115 and the intercooler 131 are arranged in the left-right direction over the engine 12; more specifically, the air cleaner 115 and the intercooler 131 are located on the left side and the right side, respectively. The surge tank 154 is located in the rear of the air cleaner 115.

When the air intake unit 111 has been attached to the main frames 213 and the duct unit 150 has been attached to the exhaust wind introduction portion 142 of the air intake unit 111, the exhaust wind duct 141 is located between the main frames 213. The expansion portion 147 of the exhaust wind duct 141 is located on the top-right of the engine 12, and the exhaust wind guide portion 148 extends rearward from a position on the top-right of the engine 12 alongside the right side frame 215 toward the center line (in the vehicle width direction). As a result, the exhaust wind outlet 149 is located at a position that is distant from the engine 12 rearward and close to the center line (in the vehicle width direction).

As described above, in the motorcycle 1 (saddle-ridden vehicle) having a supercharger according to the first aspect of the invention, since the exhaust wind duct 141 extends from the position on the top-right of the engine 12 to the rear of the engine 12, a high-temperature cooling wind that is discharged from the exhaust wind duct 141 can be prevented from blowing directly onto other components disposed around the engine 12. More specifically, according to the embodiment, the exhaust wind outlet 149 of the exhaust wind duct 141 is distant from the engine 12 rearward to below the seat 242 and is open to the rear side of the motorcycle 1. Thus, no high-temperature cooling wind blows directly onto the drive motor 175 of the electronically controlled throttle device 171. Hence, an event can be prevented that a high-temperature cooling wind hits the drive motor 175 to make its temperature high and lower its performance.

A high-temperature cooling wind is discharged rearward from the exhaust wind outlet 149 which is distant from the engine 12 rearward, and hence is prevented from being put into the air intake unit 111 as air for fuel combustion.

A high-temperature cooling wind that is discharged from the exhaust wind duct 141 whose wind discharge position and direction are set as described above flows rearward from below the seat 242, and hence can be prevented from hitting the rider sitting on the seat 242.

Since the exhaust wind duct 141 is disposed on the top-right of the engine 12, as shown in FIG. 5 a space for installation of the exhaust wind duct 141 can be secured easily. And the high-temperature wind discharge position and direction of the exhaust wind duct 141 can be set properly so that no high-temperature wind blows directly onto the drive motor 175 etc., is put into the air cleaner 115, or hits the rider.

Since the exhaust wind guide portion 148 of the exhaust wind duct 141 extends alongside the right side frame 215 in a side view of the motorcycle 1, the exhaust wind duct 141 allows a cooling wind that is discharged from the intercooler 131 to flow smoothly to the rear of the engine 12.

Since the exhaust wind duct 141 is disposed between the main frames 213 in a top view of the motorcycle 1, the width of the motorcycle 1 can be shortened while the exhaust wind duct 141 is provided.

Since the exhaust wind guide portion 148 of the exhaust wind duct 141 extends toward the center line (in the vehicle width direction), it can discharge a high-temperature cooling wind to a position that is distant from the feet etc. of the rider sitting on the seat 242. Furthermore, a cooling wind can be guided to a negative-pressure region that is formed inside the motorcycle 1 in the vehicle width direction and hence can flow out of the exhaust wind outlet 149 smoothly. As shown in part (3) of FIG. 16, the expansion portion 147 of the exhaust wind duct 141 is curved gently toward the center line (in the vehicle width direction) and the exhaust wind guide portion 148 extends straightly. This allows a cooling wind to flow smoothly.

Since the exhaust wind introduction portion 142 of the exhaust wind duct 141 is attached to the unit case 161 of the air intake unit 111 and the intercooler 131 is attached to the intercooler support portion 144 which is formed in the exhaust wind introduction portion 142 of the exhaust wind duct 141, the air cleaner 115, the exhaust wind duct 141, and the intercooler 131 can be integrated together and hence work of mounting them on the vehicle body can be simplified.

Since the exhaust wind introduction portion 142 and the duct unit 150 of the exhaust wind duct 141 are separate members, it is possible to mount, first, on the vehicle body, the air intake unit 111 being an integrated unit of the air cleaner 115, the exhaust wind introduction portion 142 of the exhaust wind duct 141, and the intercooler 131 and then attach the duct unit 150 to the exhaust wind introduction portion 142. This mounting procedure can further simplify work of attaching the exhaust wind duct 141 to the vehicle body.

Since the exhaust wind duct 141 is equipped with the expansion portion 147, a flow of a cooling wind from the intercooler 131 to the exhaust wind duct 141 can be improved. This allows a cooling wind to flow into the intercooler 131 smoothly and thereby enhances the intercooler 131's function of cooling air that has been compressed by the supercharger 121 and thereby increased in temperature.

Figure 21:
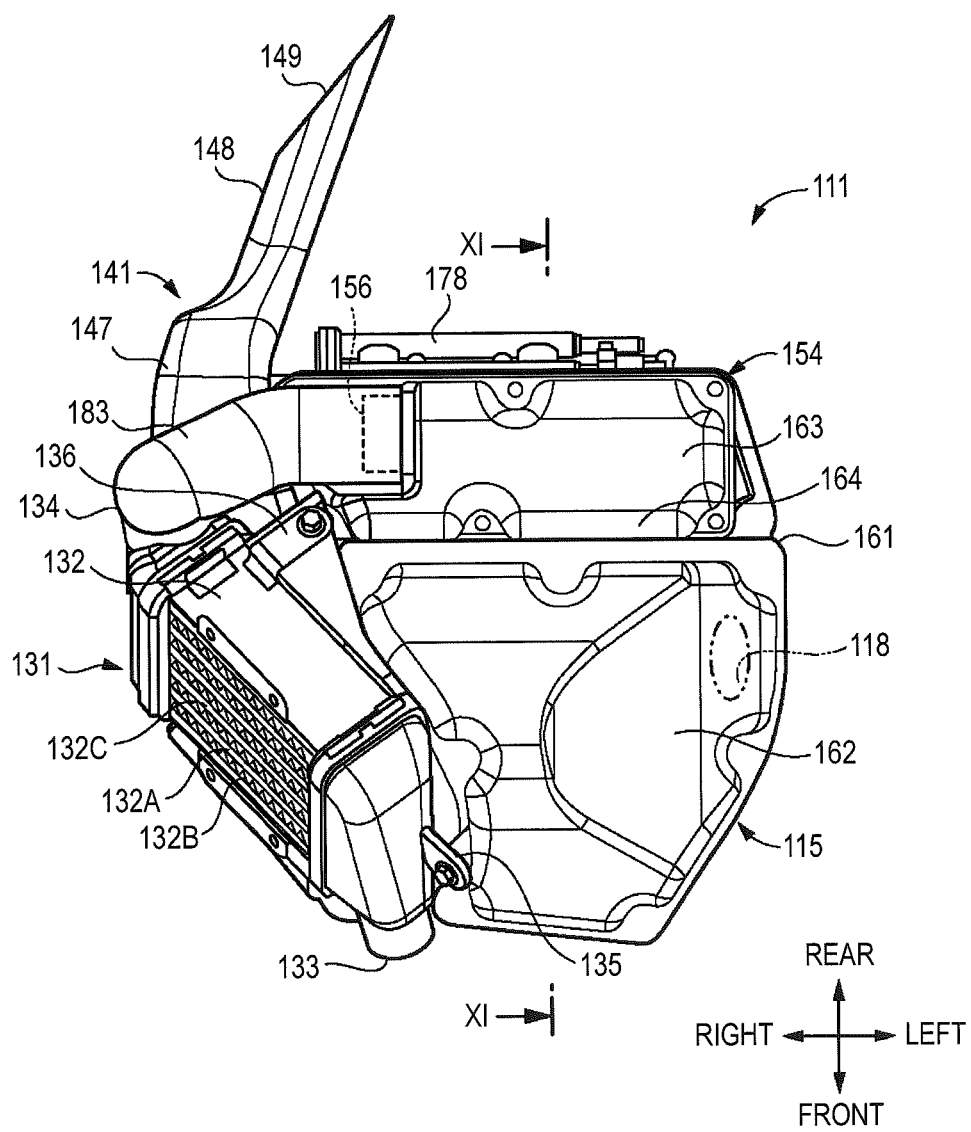
FIG. 21 is a plan view of an air intake unit etc. of a motorcycle (saddle-ridden vehicle) having a supercharger according an embodiment of to a second aspect of the invention.
Figure 23:
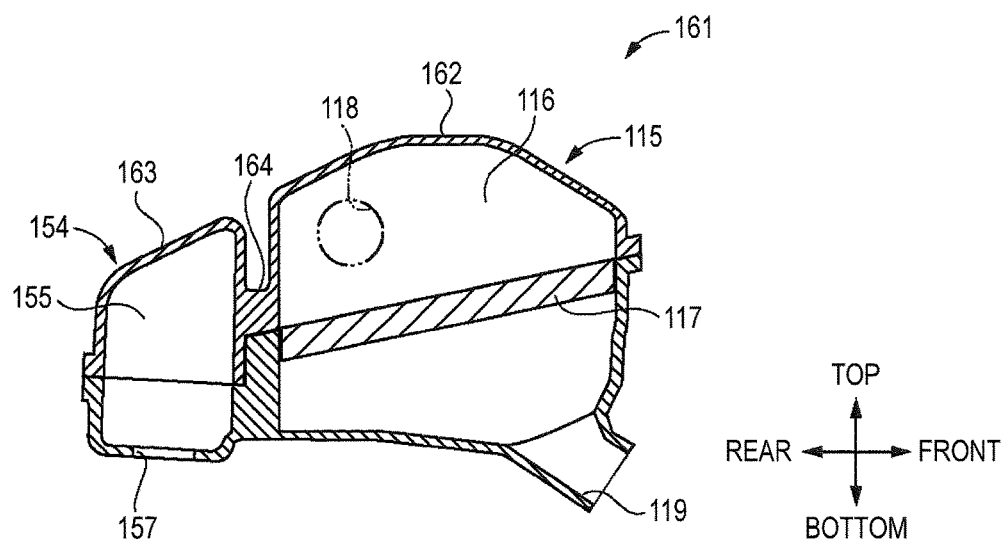
FIG. 23 is a sectional view of a unit case of the air intake unit taken along line XI-XI in FIG. 21.
Figure 24:
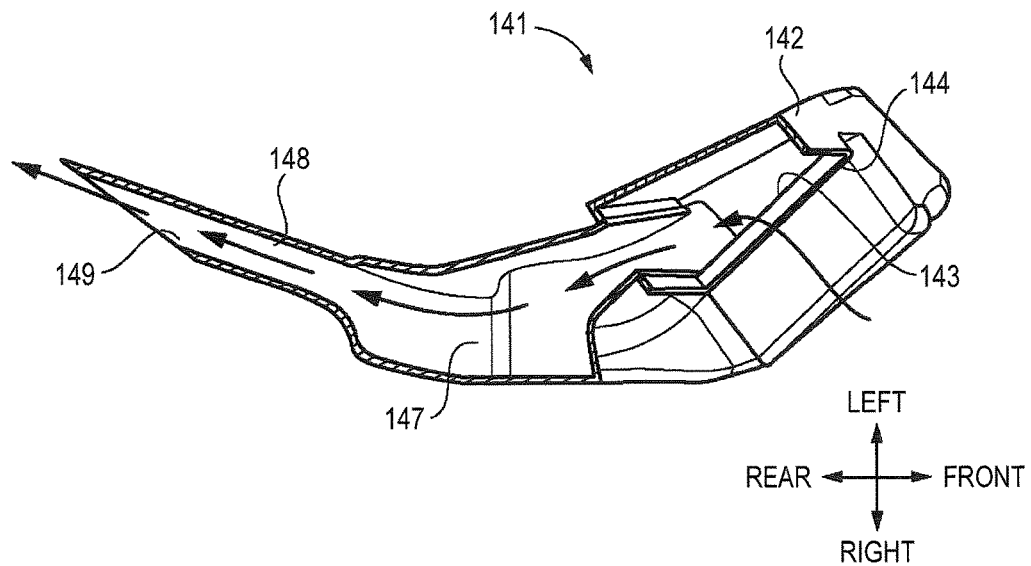
FIG. 24 is a sectional view of an exhaust wind duct of the motorcycle (saddle-ridden vehicle) having a supercharger according to the embodiment of the second aspect of the invention.

FIG. 21 shows an air intake unit 111 to which the electronically controlled throttle device 171 in an embodiment of a second aspect of the invention. FIG. 22 shows components of the air intake unit 111 together with the electronically controlled throttle device 171. FIG. 23 is a sectional view of a unit case 161 taken along line XI-XI in FIG. 21. FIG. 24 is a sectional view showing the inside of an exhaust wind duct 141

As shown in FIG. 21, the air intake unit 111 is equipped with the unit case 161 which is formed by integrating a case of the air cleaner 115 and an outer shell of the surge tank 154 and made of a resin material, for example. A front portion of the unit case 161 is a cleaner case portion 162 which corresponds to the case of the air cleaner 115. A rear portion of the unit case 161 is a tank portion 163 which constitutes the outer shell of the surge tank 154. In the unit case 161, a link portion 164 which connects the cleaner case portion 162 and the tank portion 163 is formed between them.

As shown in FIG. 23, in the unit case 161, the cleaner case portion 162 is shaped like a hollow box and a cleaner room 116 is formed inside it. An air filter 117 for filtering air is provided inside the cleaner room 116. The left wall of the cleaner case portion 162 is formed with the air inlet 118 (drawn schematically by a two-dot chain line). The position of the air inlet 118 can be set as appropriate. A bottom-front portion of the cleaner case portion 162 is formed with the air outlet 119.

In the unit case 161, the tank portion 163 is shaped like a hollow box and a rectification room 155 is formed inside it. A right portion of the tank portion 163 is formed with the air inlet 156 (see FIG. 21), and a bottom portion of the tank portion 163 is formed with the air outlet 157. In the unit case 161, the cleaner room 116 of the cleaner case portion 162 and the rectification room 155 of the tank portion 163 are separated rooms that do not communicate with each other.

As shown in FIG. 21, in the air intake unit 111, the intercooler 131 is attached to a right portion of the air cleaner 115 via the exhaust wind introduction portion 142 of the exhaust wind duct 141.

Now, a structure of the exhaust wind duct 141 will be described. As shown in FIGS. 22 and 23, the exhaust wind duct 141 is equipped with the exhaust wind introduction portion 142, an expansion portion 147, and an exhaust wind guide portion 148.

The exhaust wind introduction portion 142 is a front portion of the exhaust wind duct 141, and a cooling wind discharged from the intercooler 131 is introduced into the exhaust wind introduction portion 142. A front portion of the exhaust wind introduction portion 142 is formed with an exhaust wind inlet 143 which is open to the front-right side. The circumferential wall of the exhaust wind inlet 143 has an intercooler support portion 144 which supports the intercooler 131. A passage that causes a cooling wind to flow from the exhaust wind inlet 143 to the expansion portion 147 is formed in the exhaust wind introduction portion 142.

The expansion portion 147 is formed between the exhaust wind introduction portion 142 and the exhaust wind guide portion 148. A passage for causing a cooling wind to flow from the exhaust wind introduction portion 142 toward the exhaust wind guide portion 148 is formed in the expansion portion 147. The inflow side of the passage is connected to the passage formed in the exhaust wind introduction portion 142, and the outflow side of the passage is connected to a passage formed in the exhaust wind guide portion 148. The flow passage area of an intermediate portion, between the inflow end and the outflow end, of the passage formed in the expansion portion 147 is larger than that of the passage at each of the inflow end and the outflow end. That is, the passage formed in the expansion portion 147 is wider than the passages in front of and in the rear of it.

The exhaust wind guide portion 148 is a rear portion of the exhaust wind duct 141, and guides a cooling wind that has been introduced to the exhaust wind introduction portion 142 and flown through the expansion portion 147 so that it goes away from the engine 12 rearward. A passage for a cooling wind that flows out of the expansion portion 147 is formed in the exhaust wind guide portion 148. A rear end portion of the exhaust wind guide portion 148 is formed with an exhaust wind outlet 149 for discharging a cooling wind to the outside.

A cooling wind that has been introduced by the wind guide duct hits the receiving surface 132C of the radiation unit 132 of the intercooler 131 which is supported by the intercooler support portion 144 of the exhaust wind introduction portion 142, passes between the fins 132B of the radiation unit 132, and flows into the exhaust wind inlet 143. As indicated by arrows in FIG. 24, the cooling wind that has flown into the exhaust wind inlet 143 flows to the passage formed in the exhaust wind introduction portion 142 from the exhaust wind inlet 143, flows through the expansion portion 147, then flows through the passage formed in the exhaust wind guide portion 148, and is finally discharged to the outside from the exhaust wind outlet 149.

As shown in FIG. 22, the exhaust wind introduction portion 142 of the exhaust wind duct 141 is fixed to the right surface of the unit case 161 by welding, for example. And the intercooler 131 is attached to the intercooler support portion 144 which is formed in the right portion of the exhaust wind introduction portion 142. More specifically, the intercooler 131 is provided with fixing portions 135 and 136, the exhaust wind introduction portion 142 is formed with an attachment hole 151, and the unit case 161 is formed with an attachment portion 166. The intercooler 131 is attached to the intercooler support portion 144 by fixing the fixing portion 135 to the attachment portion 166 using a bolt, for example, and fixing the fixing portion 136 to the attachment hole 151 using a bolt, for example.

(Placement of Drive Motor 175 of Electronically Controlled Throttle Device 171)

FIG. 25 is a top view of the motorcycle 1 and shows the air intake unit 111 and the electronically controlled throttle device 171 which are arranged above the engine 12. In FIG. 25, portions, hidden by the air cleaner 115 or the surge tank 154 are drawn by broken lines and the head pipe 212 and the main frames 213 are drawn by two-dot chain lines. The reference line S shown in FIG. 25 is the same as that shown in FIG. 5, that is, the center line (in the left-right direction), extending in the front-rear direction, of the motorcycle 1.

As shown in FIG. 25, the intercooler 131 is disposed at the right position in the motorcycle 1. That is, in the embodiment, the intercooler 131 is disposed on a right of the reference line S. On the other hand, the drive motor 175 of the electronically controlled throttle device 171 is disposed on the left side in the motorcycle 1. That is, in the embodiment, the drive motor 175 is disposed on the left of the reference line S. The intercooler 131 generates heat because it is supplied with air that has been compressed by the compressor 123 of the supercharger 121 and thereby increased in temperature. However, since the intercooler 131 and the drive motor 175 are distant from each other in the left-right direction, heat that is emitted from the intercooler 131 is not prone to be transmitted to the drive motor 175. Thus, the temperature of the drive motor 175 can be prevented from being made high by heat emitted from the intercooler 131.

As seen from FIG. 22, the exhaust wind introduction portion 142 of the exhaust wind duct 141 is disposed between the intercooler 131 and the drive motor 175 and interrupts transmission of heat from the intercooler 131 to the drive motor 175. As a result, heat generated by the intercooler 131 is not prone to be transmitted to the drive motor 175.

As shown in FIG. 25, the exhaust wind duct 141 is disposed on the right side in the motorcycle 1 and its exhaust wind outlet 149 is located on the right side in the motorcycle 1 in the rear of the drive motor 175. With this arrangement, a high-temperature cooling wind that is discharged from the intercooler 131 is then discharged from the exhaust wind outlet 149 at a position that is on the rear-right of and distant from the drive motor 175, whereby the temperature of the drive motor 175 can be prevented from being increased by a high-temperature cooling wind.

As seen from FIG. 7, the intercooler 131 is located on the top-right of the drive motor 175, which means that the surge tank 154 is located between them. Thus, the surge tank 154 prevents heat transmission from the intercooler 131 to the drive motor 175, which also serves to make heat generated by the intercooler 131 less prone to be transmitted to the drive motor 175.

As shown in FIG. 25, the drive motor 175 is located below the air cleaner 115 and the surge tank 154. Since a neighborhood of the air cleaner 115 and the surge tank 154 is lower in temperature than a neighborhood of the intercooler 131, disposing the drive motor 175 under the air cleaner 115 and the surge tank 154 serves to keep the temperature of the drive motor 175 low.

The drive motor 175 is distant from the left main frame 231 and the left side frame 215 which are located on the left of the drive motor 175. As a result, a space through which a travel wind is to flow is formed between the drive motor 175 and the left main frame 213 (or the left side frame 215). This allows a travel wind to hit the drive motor 175 to thereby dissipate heat from the drive motor 175. This in turn prevents staying of heat around the drive motor 175.

As described above, in the motorcycle 1 (saddle-ridden vehicle) having a supercharger according to the embodiment of the second aspect of the invention, a phenomenon can be prevented that temperature of the drive motor 175 is made high by heat that is emitted from the intercooler 131 or heat of a cooling wind that is discharged from the intercooler 131 and its performance is lowered.

As shown in FIG. 25, since in a top view of the motorcycle 1 the intercooler 131 and the drive motor 175 are located between the pair of (left and right) main frames 213 (or the pair of (left and right) side frames 215), neither the intercooler 131 nor the drive motor 175 sticks out sideways from the motorcycle 1, whereby the width of the motorcycle 1 can be decreased.

Although in each of the above embodiments the exhaust wind duct 141 extends so as to come closer to the center line (in the vehicle width direction) as the position goes rearward, the shape of the exhaust wind duct is not limited to such a shape. Exhaust wind ducts are possible that extend so as to go away from the center line as the position goes rearward or extend rearward parallel with the center line (reference line S).

In each of the above embodiments, as shown in FIG. 6, cooling system components such as the water pump 30, the cooling water flow control unit 41, and the water pump inlet hose 55 are disposed on the right side in the motorcycle 1 and air intake system components such as the air cleaner 115, the compressor unit 123 of the supercharger 121, the air intake pipe 181, and the air outlet pipe 182 are disposed on the left side in the motorcycle 1. However, the invention is not limited to that case; the above sets of components may be disposed on the sides opposite to the above. In this case, the exhaust wind introduction portion 142 and the intercooler 131 are attached to a left portion of the air cleaner 115 (unit case 161). When the air intake unit 111 has been mounted in the motorcycle 1, the air cleaner 115 is located on the right side, the intercooler 131 is located on the left side, and the exhaust wind duct 141 is located on the top-left of the engine 12. The drive motor 175 of the electronically controlled throttle device 171 is located on the top-right or rear-right of the engine 12.

The invention can also be applied to saddle-ridden vehicles that are equipped with an ordinary, unitized radiator that is not separated into a top radiator and a bottom radiator. Furthermore, the invention can also be applied to various saddle-ridden vehicles other than motorcycles, such as tricycles and buggy-type vehicles.

The invention is not limited to the above embodiments, and various modifications are possible without departing from the spirit and scope of the invention as read from the claims and the specification body and the technical concept of the invention encompasses saddle-ridden vehicles with such modifications.

What is claimed is:

1. A saddle-ridden vehicle comprising:
    a pair of frame members which are disposed on one side of the vehicle and on an opposite side of the vehicle, respectively, in a vehicle width direction so as to extend in a vehicle front-rear direction;
    an engine which is disposed between and supported by the pair of frame members;
    an air cleaner which cleans air for fuel combustion;
    a supercharger which compresses the air cleaned by the air cleaner;
    an intercooler which cools, using a cooling wind, the air compressed by the supercharger and supplies resulting air to the engine, wherein the intercooler is disposed above the engine on the one side of the vehicle in the vehicle width direction; and
    an exhaust wind duct from which the cooling wind discharged from the intercooler is discharged, wherein:
    the exhaust wind duct is disposed above the engine on the one side of the vehicle and extends to a rear of the engine.

2. The saddle-ridden vehicle according to claim 1, wherein, in a side view of the saddle-ridden vehicle, one of the pair of frame members alongside which the exhaust wind duct extends is disposed on the one side in the vehicle width direction.

3. The saddle-ridden vehicle according to claim 1, wherein, in a top view of the saddle-ridden vehicle, the exhaust wind duct is disposed between the pair of frame members.

4. The saddle-ridden vehicle according to claim 1, wherein the exhaust wind duct extends toward a center line in the vehicle width direction.

5. The saddle-ridden vehicle according to claim 1, wherein the exhaust wind duct comprises a support portion which supports the intercooler.

6. The saddle-ridden vehicle according to claim 1, wherein the exhaust wind duct is attached to the air cleaner.

7. The saddle-ridden vehicle according to claim 1, wherein:
    the air cleaner and the intercooler are arranged side by side in the vehicle width direction above the engine;
    the exhaust wind duct comprises an exhaust wind introduction portion into which the cooling wind discharged from the intercooler is introduced and an exhaust wind guide portion which guides, to a prescribed direction, the cooling wind introduced into the exhaust wind introduction portion; and
    the exhaust wind introduction portion is disposed between the air cleaner and the intercooler.

8. The saddle-ridden vehicle according to claim 7, wherein:
    the exhaust wind duct comprises an expansion portion between the exhaust wind introduction portion and the exhaust wind guide portion; and
    the expansion portion comprises a passage through which the cooling wind flows from the exhaust wind introduction portion to the exhaust wind guide portion, and an intermediate portion of the passage is larger in flow passage area than an inflow end and an outflow end of the passage.

* * * * *